United States Patent [19]
Durfee, III et al.

[11] Patent Number: 6,151,155
[45] Date of Patent: Nov. 21, 2000

[54] GUIDED WAVE METHODS AND APPARATUS FOR NONLINEAR FREQUENCY GENERATION

[75] Inventors: Charles G. Durfee, III, Ann Arbor, Mich.; Andrew Rundquist, Austin, Tex.; Henry C. Kapteyn; Margaret M. Murnane, both of Ann Arbor, Mich.

[73] Assignee: The Regents of the University of Michigan, Ann Arbor, Mich.

[21] Appl. No.: 09/124,563

[22] Filed: Jul. 29, 1998

[51] Int. Cl.[7] .................................................... G02F 1/35
[52] U.S. Cl. ........................... 359/332; 385/122; 385/125
[58] Field of Search ................................ 359/326–332; 385/1–3, 122, 123, 125, 141–143

[56] References Cited

U.S. PATENT DOCUMENTS

| | | | |
|---|---|---|---|
| 3,935,472 | 1/1976 | Bethea et al. | 359/328 |
| 4,887,884 | 12/1989 | Hayden | 385/1 |
| 4,923,277 | 5/1990 | Okazaki et al. | 385/123 |
| 5,394,411 | 2/1995 | Milchberg et al. | 372/5 |
| 5,956,173 | 9/1999 | Svelto et al. | 359/332 |

FOREIGN PATENT DOCUMENTS

| | | | |
|---|---|---|---|
| 3-225327 | 10/1991 | Japan | 359/328 |

OTHER PUBLICATIONS

Decker et al., "Enhancement of Two–Photon Resonant Third–Harmonic Generation of a $CO_2$ Laser in Gaseous $CD_4$," *IEEE Journal of Quantum Electronics* 25:1747–1751 (Jul. 1989).

Zwernemann et al., "Enhancement of Third Harmonic Generation in Metal–Dielectric Waveguides," *Applied Optics* 18:728–732 (Mar. 1979).

Backus et al., "16–fs, 1–$\mu$J Ultraviolet Pulses Generated by Third–Harmonic Conversion in Air," *Optics Letters* 21:665–667 (May 1996).

L'Huillier et al., "High–Order Harmonic Generation in Rare Gases with a 1–ps 1053–nm Laser," *Physical Review Letters* 70:774–777 (Feb. 1993).

Myers et al., "Quasi–Phase–Matched Optical Parametric Oscillators in Bulk Periodically Poled $LiNbO_3$," *J. Opt. Soc. Am. B* 12:2102–2116 (Nov. 1995).

Nisoli et al., "Generation of High Energy 10 fs Pulses by a New Pulse Compression Technique," *Appl. Phys. Lett.* 68:2793–2795 (May 1996).

Nisoli et al., "Compression of High–Energy Laser Pulses Below 5 fs," *Optics Letters* 22:522–524 (Apr. 1997).

Milchberg et al., "High–Order Frequency Conversion in the Plasma Waveguide," *Physical Review Letters* 75:2494–2497 (Sep. 1995).

Shkolnikov et al., "Phase Matching for Large–Scale Frequency Upconversion in Plasma," *Optics Letters* 18:1700–1702 (Oct. 1993).

(List continued on next page.)

*Primary Examiner*—John D. Lee
*Attorney, Agent, or Firm*—Klarquist Sparkman Campbell Leigh & Whinston, LLP

[57] ABSTRACT

Methods and apparatus are disclosed for the nonlinear generation of sum and difference frequencies of electromagnetic radiation propagating in a nonlinear material. A waveguide having a waveguide cavity contains the nonlinear material. Phase matching of the nonlinear generation is obtained by adjusting a waveguide propagation constant, the refractive index of the nonlinear material, or the waveguide mode in which the radiation propagates. Phase matching can be achieved even in isotropic nonlinear materials. A short-wavelength radiation source uses phase-matched nonlinear generation in a waveguide to produce high harmonics of a pulsed laser.

28 Claims, 12 Drawing Sheets

OTHER PUBLICATIONS

Shkolnikov et al., "Optimal Quasi–Phase–Matching for High–Order Harmonic Generation in Gases and Plasma," *Physical Review A 50*:R4461–R4464 (Dec. 1994).

Young et al., "Third–Harmonic Generation in Phase–Matched Rb Vapor," *Physical Review Letters 27*:1551–1553 (Dec. 1971).

Chu et al., "Tunable V.U.V. Radiation Generated by Non–Resonant Phase Matched Odd Harmonic Generation in Xenon Gas," *J. Phys. France 49*:1725–1729 (Oct. 1988).

Ward et al., "Optical Third Harmonic Generation in Gases by a Focused Laser Beam," *Physical Review 185*:57–72 (Sep. 1969).

Bjorklund, G.C., "Effects of Focusing on Third–Order Nonlinear Processes in Isotropic Media," *IEEE Journal of Quantum Electronics QE–11*:287–296 (Jun. 1975).

Arkhipkin et al., "Frequency Mixing in a Gas–Filled Waveguide for VUV Light Generation," *Appl. Phys. B 37*:93–97 (no month) (1985).

Castillejo et al., "Coherent Vacuum Ultraviolet Generation by Frequency Mixing in Glass Hollow Waveguides," *Appl. Phys. B 45*:293–299 (no month) (1988).

Rabinowitz et al., "Waveguide $H_2$ Raman Laser," *Applied Optics 15*:2005–2006 (Sep. 1976).

Stolen et al., "Parametric Amplification and Frequency Conversion in Optical Fibers," *IEEE Journal of Quantum Electronics QE–18*:1062–1072 (Jul. 1982).

Heuer et al., "Stimulated Raman Effect and Four–Wave Mixing in a Hollow Waveguide," *IEEE Journal of Quantum Electronics 24*:2087–2100 (Oct. 1988).

Macklin et al., "High–Order Harmonic Generation Using Intense Femtosecond Pulses," *Physical Review Letters 70*:766–769 (Feb. 1993).

Zhou et al., "Enhanced High–Harmonic Generation Using 25 fs Laser Pulses," *Physical Review Letters 76*:752–755 (Jan. 1996).

L'Huillier et al., "Propagation Effects in High–Order Harmonic Generation in Rare Gases," *J. Opt. Soc. Am. B 7*:527–536 (Apr. 1990).

Rae et al., "Generation and Propagation of High–Order Harmonics in a Rapidly Ionizing Medium," *Physical Review A 50*:3438–3446 (Oct. 1994).

Kung et al., "Generation of 1182–Å Radiation in Phase–Matched Mixtures of Inert Gases," *Appl. Phys. Lett. 22*:301–302 (Mar. 1973).

L'Huillier et al., "Theoretical Aspects of Intense Field Harmonic Generation," *J. Phys. B: At. Mol. Opt. Phys. 24*:3315–3341 (no month) (1991).

L'Huillier et al., "High–Order Harmonic Generation in Xenon at 1064 nm: The Role of Phase Matching," *Physical Review Letters 66*:2200–2203 (Apr. 1991).

Marcatili et al., "Hollow Metallic and Dielectric Wave–Guides for Long Distance Optical Transmission and Lasers," *The Bell System Technical Journal 43*:1783–1809 (Jul. 1964).

Agrawal, G.P., *Nonlinear Fiber Optics*, Academic Press, pp. 415–423 (San Diego, 1995) (no month).

Reintjes, J.F., *Nonlinear Optical Parametric Processes in Liquids and Gases*, Academic Press, pp. 31–59 (New York, 1984) (no month).

D.B. Anderson and J.T. Boyd, "Wideband $CO_2$ Laser Second Harmonic Generation Phase Matched in GaAs Thin–Film Waveguides," *Applied Physics Letters 19*:266–268 (Oct. 1971).

R.H. Stolen et al., "Phase–Matched Three–Wave Mixing in Silica Fiber Optical Waveguides," *Applied Physics Letters 24*:308–310 (Apr. 1974).

R.B. Miles et al., "Coherent Anti–Stokes Raman Scattering in a Hollow Dielectric Waveguide," *Applied Physics Letters 30*:417–419 (Apr. 1977).

Steven M. Zwernemann and Michael F. Becker, "Enhancement of Third Harmonic Generation in Metal–Dielectric Waveguides," *Applied Optics 18*:728–732 (Mar. 1979).

George L. Stegeman and Roger H. Stolen, "Waveguides and Fibers For Nonlinear Optics," *Journal of the Optical Society of America B–Optical Physics 6*:652–662 (Apr. 1989).

Okihiro Sugihara et al., "Phase–Matched Second Harmonic Generation in Poled Dye/Polymer Waveguide," *Applied Optics 30*:2957–2960 (Jul. 1991).

G.L.J.A. Rikken et al., "Efficient Modal Dispersion Phase–Matched Frequency Doubling in Poled Polymer Waveguides," *Applied Physics Letters 62*:2483–2485 (May 1993).

A.K. Angelow and P.P. Kircheva, "Tunable Four–Wave Mixing in Low–Mode–Number Optical Fibers," *Applied Optics 33*:3203–3208 (May 1994).

M. Jäger et al., "Modal Dispersion Phase Matching Over 7 mm Length in Overdamped Polymeric Channel Waveguides," *Applied Physics Letters 69*:4139–4141 (Dec. 1996).

M. Jäger et al., "Poling and Characterization of Polymer Waveguides For Modal Dispersion Phase–Matched Second–Harmonic Generation," *Journal of the Optical Society of America B–Optical Physics 15*:781–788 (Feb. 1998).

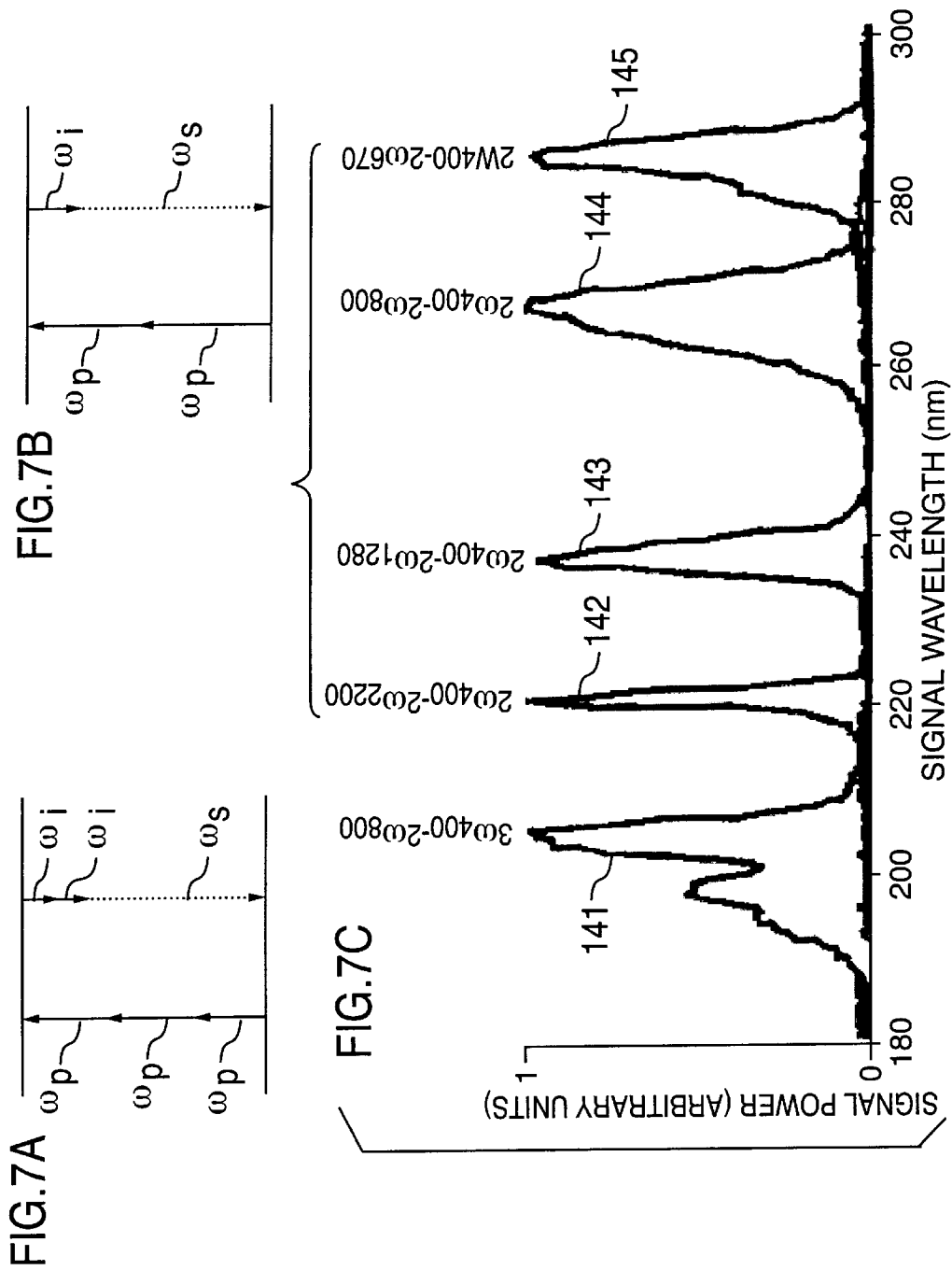

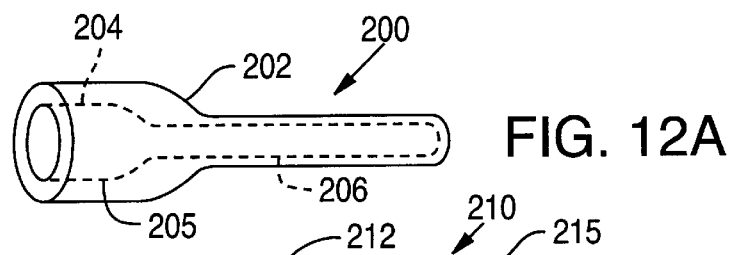
FIG. 12A
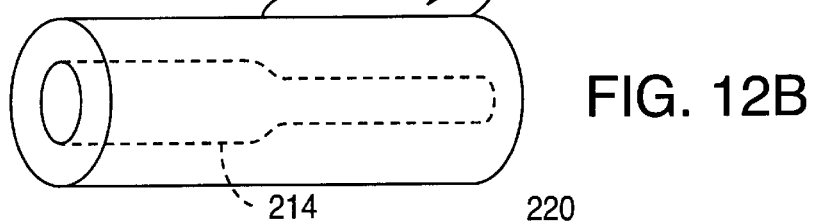
FIG. 12B
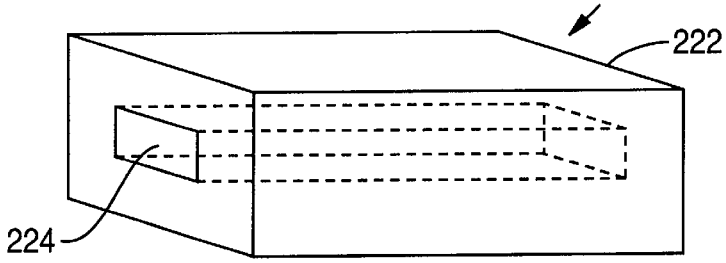
FIG. 12C
FIG. 12D
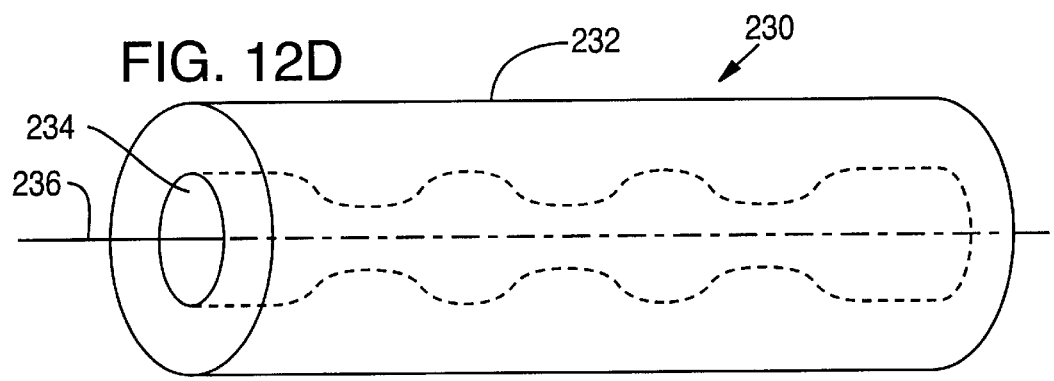
FIG. 12E
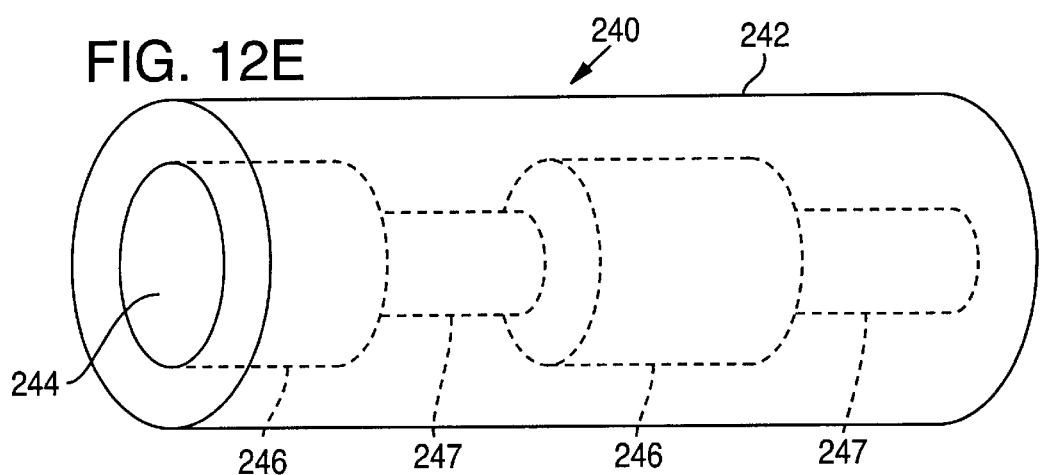

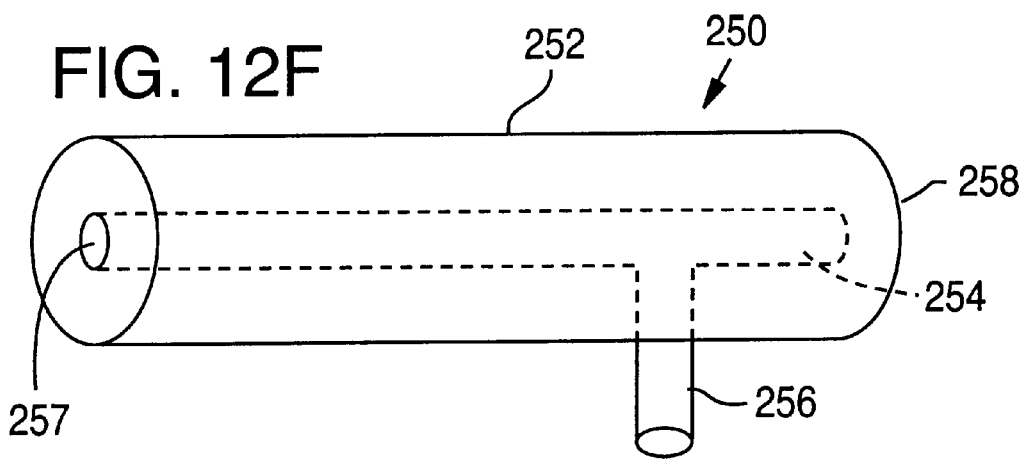
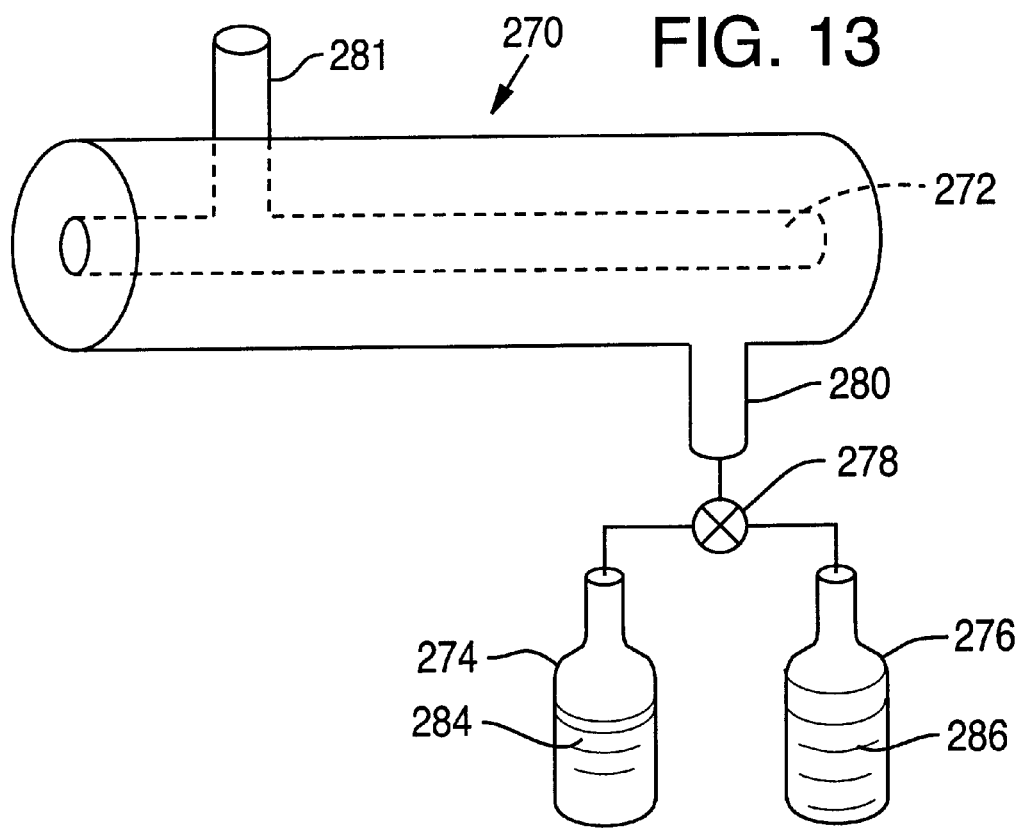

GUIDED WAVE METHODS AND APPARATUS FOR NONLINEAR FREQUENCY GENERATION

ACKNOWLEDGMENT

This invention was made with U.S. government support under contracts PHY8920108 and ECS9616079, awarded by the National Science Foundation, and contract DEFG0296ER12196, awarded by the Department of Energy. The government has certain rights in the invention.

FIELD OF THE INVENTION

The invention pertains to waveguides for nonlinear optical frequency generation.

BACKGROUND OF THE INVENTION

The high optical intensities available from lasers have made practical the use of nonlinear methods to convert the laser wavelength to its harmonics. Nonlinear optical methods have also been used to mix laser radiation at two or more frequencies to produce radiation at the sum and difference frequencies. In addition, nonlinear devices have been placed within resonant cavities to form parametric oscillators that generate tunable radiation.

Practical applications of nonlinear methods require the efficient generation of optical harmonics or of sum or difference frequencies. Efficient nonlinear frequency conversion requires a material with a large nonlinear optical susceptibility and phase matching of the conversion process. Applications of nonlinear frequency conversion have relied almost exclusively on crystalline nonlinear optical materials because of their large nonlinear optical susceptibilities and their ability to phase match the nonlinear process. Efficient nonlinear conversion is typically achieved by selecting anisotropic crystals having large second-order nonlinear susceptibilities and that allow birefringence-based phase-matching schemes.

Prior art methods using anisotropic crystals and birefringent phase matching have significant limitations. First, most crystals are not transparent to radiation of wavelengths of less than about 200 nm, limiting the range of wavelengths that can be generated or used in nonlinear conversion processes. Second, dispersion in a crystal produces a large group velocity walk-off so that pulses of different wavelengths propagate at different speeds. In some cases, the pulses temporally overlap within the crystal only for very short distances, severely limiting the conversion efficiency, especially for very short (<100 fs) pulses. Third, because of the broad spectral width of short pulses, phase matching is achieved only for very thin crystals, also limiting conversion efficiency. Finally, phase matching in crystals depends on the propagation direction of the laser beam with respect to the crystalline axes. Unfortunately, a tightly focused beam (for increased beam intensity and increased conversion efficiency) has a large divergence so that portions of such a beam propagate at angles for which the angle-dependent phase-matching condition is not satisfied.

In contrast to crystals, many gases are transparent to wavelengths as short as 100 nm; helium is transparent to wavelengths as short as about 50 nm. Gases are accordingly appropriate nonlinear materials for frequency-conversion into the deep and vacuum ultraviolet ("UV"), and x-ray regions of the spectrum. Unfortunately, the nonlinear susceptibilities of gases are relatively small and, more importantly, established phase-matching techniques based on crystalline birefringence are inapplicable because gases are isotropic. Nevertheless, the use of non-phase-matched harmonic conversion in gases has been used to generate light in the UV to soft x-ray regions of the spectrum but with the low conversion efficiencies expected without phase matching.

The nonlinear generation of short pulses at sum, difference, or harmonic frequencies presents an additional difficulty. Short pulses are necessarily spectrally broad and propagation in a dispersive material extends the pulse duration. To maintain a short pulse duration, thin crystals must be used, limiting the nonlinear conversion efficiency.

Optical parametric generators using crystals have been used to generate short pulses that are wavelength tunable, but these generators exhibit the problems associated with crystals. Because of absorption in the crystals, these generators are not generally efficient for wavelengths shorter than about 200 nm.

Other prior art short pulse sources for short wavelengths are expensive, inefficient, and produce much longer duration pulses. For example, short pulses from a synchrotron source have pulse durations of about 70 ps.

There are many applications for improved short-wavelength radiation sources. Some lithographic systems use ultraviolet radiation at wavelengths of about 250 nm to transfer patterns from a mask to a semiconductor wafer. Because the minimum feature size produced on a wafer is proportional to the wavelength used for the pattern transfer, higher resolution lithography requires even shorter wavelengths. In addition, short-wavelength radiation is required for optical testing at wavelengths between 2 nm and 200 nm.

It is apparent from the foregoing that improved methods and apparatus are needed for efficient nonlinear generation of short pulses and short wavelengths.

SUMMARY OF THE INVENTION

According to a first aspect of the invention, methods for phase matching the nonlinear generation of a signal in waveguides containing a nonlinear material are provided. According to a preferred embodiment, a waveguide defining a waveguide cavity and a nonlinear material is selected and the nonlinear material is placed in the waveguide cavity. Electromagnetic radiation is directed into and propagates in the waveguide cavity. The waveguide has a propagation constant $k_{mode}$ that is dependent on the structure of the waveguide and the waveguide mode in which the electromagnetic radiation propagates. The nonlinear material has a propagation constant $k_{material}$ and an index of refraction n. Either or both of the propagation constants $k_{mode}$, $k_{material}$ are adjusted to phase match the nonlinear generation of the signal. The nonlinear material selected can be an isotropic material such as a gas or liquid.

In one specific embodiment of the method, a gas is selected and phase matching is achieved by adjusting the index of refraction of the gas by adjusting the gas pressure.

In another specific embodiment of the method, a fluid comprising a mixture of fluid components is selected as the nonlinear material. Phase matching is achieved by adjusting the refractive index of the mixture by adjusting the relative proportions of at least two of the fluid components, or by adjusting fluid pressure or pH.

In another specific embodiment of the method, phase matching is achieved by directing the radiation into a selected waveguide mode or selecting a waveguide cross-sectional dimension to obtain a selected waveguide propagation constant.

According to another aspect of the invention, methods are provided for multistage nonlinear generation of a signal. A first nonlinear generation stage is phase matched in a waveguide containing a first nonlinear material, producing an intermediate signal. The intermediate signal is phase matched in a second nonlinear generation in a waveguide containing a second nonlinear material to produce the signal. In such methods for nonlinear generation of a signal, a waveguide having a waveguide cavity can be provided. An ionized gas having a free electron density is disposed in the waveguide cavity. Input frequencies to the waveguide are selected so that phase matching is achieved independently of or with a reduced sensitivity to the free electron density.

According to still another aspect of the invention, methods for nonlinear generation of a signal from a pump and an idler, the signal, pump, and idler having frequencies $\omega_s$, $\omega_p$, $\omega_i$ and free space wavelengths $\lambda_p$, $\lambda_s$, $\lambda_i$, respectively, wherein $\omega_s = N\omega_p - M\omega_i$ and N, M are integers. The method comprises providing a waveguide that defines a waveguide cavity having waveguide modes and disposing a nonlinear material in the cavity. The pump and idler are directed into the cavity and a phase-matching condition is satisfied with a combination of the refractive index of the nonlinear material and the waveguide modes. In a specific embodiment, the refractive index of the nonlinear material defines a material-coherence length and the waveguide defines an interaction length, wherein the interaction length is at least two times the material-coherence length. In another specific embodiment, the waveguide cavity is cylindrical and has a radius a and a length L and the signal, pump, and idler propagate with modal constants $u_s$, $u_p$, $u_i$, respectively. The phase-matching condition is:

$$\pi \geq \frac{L}{4\pi a^2}[u_s^2 \lambda_s + M u_i^2 \lambda_i - N u_p^2 \lambda_p] -$$

$$2\pi L \left[\frac{n_s}{\lambda_s} + \frac{M n_i}{\lambda_i} - \frac{N n_p}{\lambda_p}\right] \geq -\pi$$

According to another aspect of the invention, apparatus for nonlinear generation are provided. A preferred embodiment comprises a waveguide that defines a waveguide cavity containing a nonlinear material. The propagation constants of the waveguide and the nonlinear material are selected to satisfy a phase-matching condition. Specific embodiments of the apparatus are provided in which the nonlinear material is a gas and a pressure regulator controls the index of refraction of the gas to achieve phase matching. In other specific embodiments, the nonlinear-material is a fluid comprising a mixture of fluid components and a mixing valve is provided to adjust the relative proportions of the fluid components in the mixture to achieve phase matching.

In a further specific embodiment, an apparatus for generating radiation at a wavelength between 2 nm and 300 nm is provided. The apparatus comprises a laser source and a waveguide containing a nonlinear material and satisfying a phase-matching condition.

Another specific embodiment comprises a waveguide having a first, second, and a third section and defining respective cavities. The second section is defined in a gas chamber, and gas seals are provided so that the first and third sections extend into the gas chamber. A gas supply delivers gas to the gas chamber; the gas flows into the second cavity and exits the gas chamber by flowing through the first and third cavities. The gas pressure is adjusted by a regulator for atching. The first and third cavities extend into a vacuum enclosure that is evacuated by a pump.

Another embodiment of an apparatus for nonlinear generation comprises a waveguide that defines a waveguide cavity having waveguide modes. A nonlinear material is disposed in the cavity and a phase-matching condition is satisfied with a combination of the refractive index of the nonlinear material and the waveguide modes. The refractive indices of the nonlinear material at the signal, pump, and idler wavelengths can define a material-coherence length. The waveguide defines an interaction length, wherein the interaction length is at least two times the material-coherence length.

In yet another embodiment, the waveguide cavity is cylindrical and has a radius a and a length L, the signal, pump, and idler propagate with modal constants $u_s$, $u_p$, $u_i$, respectively. The phase-matching condition is:

$$\pi \geq \frac{L}{4\pi a^2}[u_s^2 \lambda_s + M u_i^2 \lambda_i - N u_p^2 \lambda_p] -$$

$$2\pi L \left[\frac{n_s}{\lambda_s} + \frac{M n_i}{\lambda_i} - \frac{N n_p}{\lambda_p}\right] \geq -\pi$$

Other features and advantages of the invention will be apparent from the following detailed description and drawings.

BRIEF DESCRIPTION OF THE DRAWINGS

FIG. 7A illustrates nonlinear generation in which three pump photons produce two idler photons and one signal photon.

FIG. 7B illustrates nonlinear generation in which two pump photons produce one idler photon and one signal photon with a tunable idler.

FIG. 7C contains graphs of signal power as function of wavelength for the nonlinear generation processes of FIGS. 7A–7B.

FIGS. 12A–12F are perspective views of various possible waveguide configurations.

FIG. 13 schematically depicts a phase-matching waveguide using a mixture of fluids.

DETAILED DESCRIPTION

Figure 1:
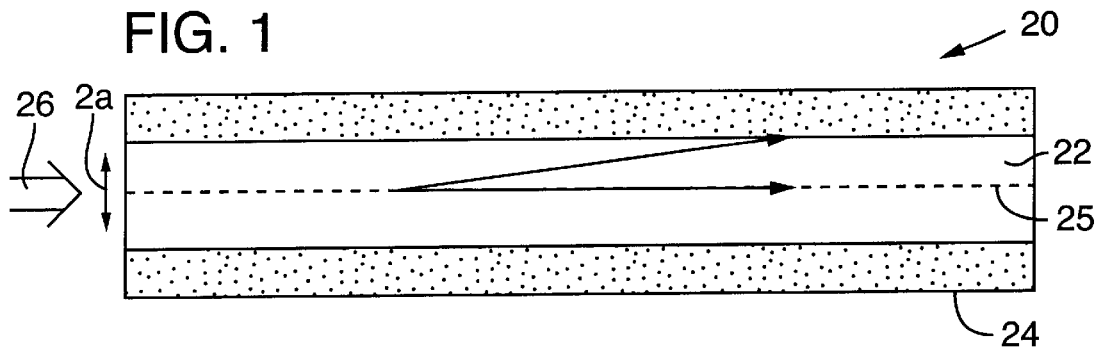
FIG. 1 is a sectional view of a hollow-core waveguide.

The phase velocity of a laser beam (or other electromagnetic radiation) propagating in a waveguide is dependent on the laser frequency, the waveguide structure, and the spatial mode of the waveguide in which the beam propagates. This variation in phase velocity with frequency is referred to herein as "waveguide dispersion." In addition, the refractive index of materials varies with wavelength; this variation is referred to as "material dispersion."

Sum and difference frequencies and harmonics of incident electromagnetic radiation can be generated using the nonlinear polarization induced by the electromagnetic radiation in a material. The generation of sum or difference frequencies between two or more input laser beams or other electromagnetic radiation in a nonlinear material is referred to herein as "nonlinear generation." The generation of harmonic frequencies of a laser beam or other electromagnetic radiation is also referred to as "nonlinear generation."

Neglecting dispersion, a component $P_i$ of a polarization induced in a material is given by the series expansion:

$$P_i = \sum_j \chi_{ij}^{(1)} E_j + \sum_{j,k} \chi_{ijk}^{(2)} E_j E_k + \sum_{j,k,l} \chi_{ijkl}^{(3)} E_j E_k E_l + \cdots$$

where the $\chi$ terms are material-dependent susceptibilities and the E terms are electric field components of incident electromagnetic radiations. Note that one of the electric field components can be at a very low frequency. Susceptibilities $\chi^{(m)}$ for m>1 produce nonlinear polarizations that permit nonlinear generation. The nonlinear polarizations can generate electromagnetic radiation at frequencies that are the sum, difference, or harmonics of the frequencies of the incident optical radiations. Integer multiples of a frequency are referred as respective "harmonics." The susceptibilities $\chi^{(m)}$ generally decrease as m increases, except for very strong applied fields.

Nonlinear generation is generally efficient only if a phase-matching condition is satisfied. Because embodiments of the invention are described with reference to phase matching in isotropic materials, an exemplary phase-matching condition using the nonlinear polarization produced by $\chi^{(3)}$ is briefly described. If the electromagnetic radiations that produce a nonlinear polarization have propagation constants $k_j$, $k_k$, $k_l$, (i.e., the electric fields are proportional to $e^{ikz}$) and center frequencies $\omega_j$, $\omega_k$, $\omega_l$, respectively, and the generated optical radiation has a propagation constant $k_m$ and a center frequency $\omega_m$, then the phase-matching condition for generating the frequency $\omega_m = \omega_j + \omega_k - \omega_l$ is:

$$\Delta k = k_j + k_k - k_l - k_m = 0$$

If the radiations propagate a distance L in the nonlinear material, then phase matching is generally satisfactory if $L|\Delta k| < \pi$.

Similar phase-matching conditions apply for phase matching other sum and difference frequencies and for the nonlinear polarizations involving other values of $\chi^{(m)}$. Phase matching is discussed in, for example, Zernike and Midwinter, *Applied Nonlinear Optics*, John Wiley and Sons, 1973.

For convenience, embodiments of the invention are described with application to the electromagnetic radiation from a laser ("laser beam"). A laser beam propagating in a material of refractive -index n has a propagation constant $k = 2\pi n/\lambda$. If the laser beam is confined by a waveguide, then the propagation constant k depends on the waveguide structure and the spatial mode as well.

With reference to FIG. 1, a hollow-core waveguide 20 comprises a cylindrical cavity 22 of radius a and extending along an axis 25. The cavity 22 is defined by a cylindrical shell 24 and contains a nonlinear material, or a mix of materials, some portion of which provides the strongest nonlinearity. A laser beam 26 is directed into the cavity 22 and is confined in the cavity 22 by reflections from the shell 24.

The laser beam 26 propagates in the waveguide 20 with a propagation constant k that depends on the laser wavelength, the radius a of the cavity 22, the spatial mode, and the properties of the nonlinear material, which in turn may vary with the applied electromagnetic fields. The properties of cylindrical, hollow-core waveguides such as the waveguide 20 are calculated in Marcatili and Schmeltzer, "Hollow Metallic and Dielectric Waveguides for Long Distance Optical Transmission and Lasers," *Bell System Technical Journal,* July, 1964, pages 1783–1809, which is incorporated herein by reference. The propagation constant k for a cylindrical hollow-core waveguide filled with a medium of refractive index $n_g$ is given by:

$$k = \frac{2\pi n_g(\lambda)}{\lambda}\left[1 - \frac{1}{2}\left(\frac{u_{nm}\lambda}{2\pi a}\right)^2\left(1 + \text{Im}\left(\frac{v_{EH}\lambda}{\pi a}\right)\right)\right] \quad (1)$$

where a is the radius of the cavity 22, $u_{nm}$ is a modal constant, and $\upsilon_{EH} = (\upsilon^2+1)/2[(\upsilon^2-1)]^{1/2}$ wherein $\upsilon$ is the ratio of the refractive index of the shell 24 to the refractive indexing of the nonlinear material in the cavity 22. For short wavelengths, i.e., $\lambda \ll a$, the contribution of the waveguide to the propagation constant is small, but is usually important for phase matching.

For $\upsilon > 1$, the waveguide is lossy but Fresnel reflections at the wall 24 permit lossy guiding. For so-called hybrid modes $EH_{nm}$ of the hollow-core waveguide 20, the attenuation coefficient $\alpha$ is given by:

$$\frac{\alpha}{2} = \left(\frac{u_{nm}\lambda}{2\pi}\right)^2 \frac{\lambda^2}{a^3}\text{Re}(v_{EH})$$

where $\text{Re}(\upsilon_{EH})$ is the real part of $\upsilon_{EH}$. The loss per unit length of the fiber is a function of wavelength. Generally long wavelengths experience more loss. This loss can be used to advantage. For example, after the signal is generated, further propagation in a material-filled or an evacuated waveguide can be used to attenuate the pump. The attenuation can be in the waveguide used for the nonlinear generation, or an additional waveguide section can be provided.

If the cavity 22 contains a gas, $\upsilon_{EH}\lambda/\pi a$ is generally real and the last term in Equation 1 above is zero. The expression for the propagation constant k simplifies to $$k = \frac{2\pi n_g(\lambda)}{\lambda}\left[1 - \frac{1}{2}\left(\frac{u_{nm}\lambda}{2\pi a}\right)^2\right] \quad (2)$$

Referring to Equation 2, the propagation constant k can be considered to be the sum of a material-dependent quantity (through the refractive index $n_g$) and a waveguide mode-dependent quantity. For a gas, the index of refractive $n_g$ is given by:

$$n_g = 1 + p\delta(\lambda)$$

where p is the gas pressure in the waveguide and $\delta(\lambda)$ is the wavelength-dependent contribution of the gas. Often, $p\delta(\lambda)$ is small and the product of $p\delta(\lambda)$ with the waveguide-dependent portion of Equation 2 is negligible. However, the product term can be included. Negotiating the term involving $p\delta(\lambda)/a^2$, the propagation constant k is the sum of propagation constants corresponding to the gas and to the waveguide mode, $k_{material}$ and $k_{mode}$, respectively, where:

$$k_{material} = \frac{2\pi n_g(\lambda)}{\lambda} \text{ and}$$

$$k_{mode} = -\frac{\lambda u_{nm}^2}{4\pi a^2}$$

There can also be a radial dependence to the material dispersion, i.e., $n_g = n_g(r, \omega)$. The radial dependence can be caused by the incident laser beam by, for example, ionization, contributions from the nonlinear refractive index, or by photochemical reaction. In this case, the full propagation constant can be calculated by solving the radial wave equation. In general, the mode structure changes, but if $n_g$ is only weakly dependent on r, then the modes are the same as for $n_g = n_g(\omega)$, and an effective refractive index is determined by averaging over the mode profile.

For efficient nonlinear generation, a phase-matching condition must be satisfied. In a general parametric generation process, N photons of a "pump" beam at a frequency $\omega_p$ and a wavelength $\lambda_p$ produce M photons of an "idler" beam at a frequency $\omega_i$ and a wavelength $\lambda_i$, and a "signal" photon at a frequency $\omega_s$ and a wavelength $\lambda_s$, where the pump, idler, and signal frequencies are related by $\omega_s = N\omega_p - M\omega_i$. The propagation constants of signal, idler, and pump are $k_s$, $k_i$, $k_p$, respectively. Other parametric processes involving additional frequencies are possible as well, including near-zero frequencies that may be unguided. Self-phase modulation and Raman generation, while not phase-matched processes, can be used to generate frequency components to be mixed in the same or a subsequent waveguide stage. Note that harmonic generation is included as a particular parametric process for which M=0. In general, the parametric process generates a signal at a signal frequency and adds to the idler.

For propagation in a nonlinear medium within a waveguide, the net phase mismatch depends on $k_{material}$ and $k_{mode}$. The phase-matching condition for this process is:

$$\Delta k = 0 = k_s + Mk_i - Nk_p$$

With modal constants $u_s$, $u_i$, $u_p$ and gas constants $\delta(\lambda_s)$ $\delta(\lambda_i)$, $\delta(\lambda_p)$ corresponding to propagation at free space wavelengths $\lambda_s$, $\lambda_i$, $\lambda_p$, respectively, the phase-matching condition is:

$$\Delta k = \Delta k_{mode} - \Delta k_{material} = 0$$

where $\Delta k$ is:

$$\Delta k = \frac{1}{4\pi a^2}[u_s^2 \lambda_s + M u_i^2 \lambda_i - N u_p^2 \lambda_p] - \quad (3)$$

-continued $$2\pi p \left[ \frac{\delta(\lambda_s)}{\lambda_s} + \frac{M\delta(\lambda_i)}{\lambda_i} - \frac{N\delta(\lambda_p)}{\lambda_p} \right]$$

wherein p is the gas pressure.

If $\omega_p$ is a harmonic of $\omega_i$, then $\omega_p = R\omega_i$, where R is an integer and the frequencies $\omega_s$, $\omega_i$, $\omega_p$ correspond to respective free-space wavelengths $\lambda_s$, $\lambda_i$, $\lambda_p$ such that $\lambda_p = \lambda_i/R$ and $\lambda_s = \lambda_i/(NR-M)$. The phase-matching condition is then:

$$0 = \Delta k = \frac{\lambda_i}{4\pi a^2}\left[\frac{u_s^2}{RN-M} + M u_i^2 - N\frac{u_p^2}{R}\right] - \quad (4)$$

$$\frac{2\pi p}{\lambda_i}[(RN-M)\delta(\lambda_s) + M\delta(\lambda_i) - N\delta(\lambda_p)]$$

In gases or plasmas having normal dispersion, $\Delta k_{material} > 0$ because the index of refraction decreases with increasing wavelength. By selecting appropriate waveguide modes (i.e., modal constants u) for the pump and the signal, there is a pressure p for which $\Delta k = 0$ and phase matching is achieved.

As a first example, for sum-difference frequency generation with N=2, M=1, R=2, $u_p = u_i$ ($\omega_s = 2\omega_p - 1\omega_i = 4\omega_i - \omega_i$), the condition $\Delta k_{mode} > 0$ can be satisfied for any signal mode. Any pair of modes $u_i = u_p$ can be phase matched to any selected mode $u_s$ and the pump and idler need not be coupled only to the lowest-order mode.

As a second example, phase matching the nonlinear generation of the third harmonic ($\omega_s = 3\omega_p$, M=0, N=3), requires an output mode for which $u_s/N > u_p$. If N=3 and the pump (the fundamental) is in the lowest-order $EH_{11}$ mode ($u_p = u_{11} = 2.405$), then the lowest-order signal mode that permits phase matching is the $EH_{13}$ mode for which $u_{13} = 8.654$. Using the dispersion data in Dalgarno and Kingston, *Proc. Royal Soc. London, Ser. A*, vol. 259, page 424 (1966), the calculated phase-matching pressure for krypton gas in a waveguide with a=76 µm for $\lambda_p$=800 nm is p=61 Torr. In this example, the pump and the signal propagate in different waveguide modes.

The description above pertains to the phase matching of nonlinear processes in gas filled, cylindrically symmetric, hollow-core waveguides. However, phase matching can be achieved by balancing the waveguide and material contributions to the propagation constant in waveguides of other shapes or containing liquid or solid nonlinear materials. While a single gas is a convenient nonlinear material, a mixture of gases can be used with one component of the mixture providing a large nonlinear susceptibility while another component facilitates phase matching. The nonlinear material can also be a mixture of liquids.

Given a waveguide having a cross-sectional dimension, the gas pressure, input frequencies, the input spatial modes, the mixture of materials with different dispersive characteristics, the ionization fraction, and the input intensity are adjustable for phase matching as well as to control the signal frequency and the signal spatial mode. Although an advantage of the waveguide phase-matching method is that it allows the use of isotropic materials, in some instances an anisotropy can be introduced and can assist in phase matching. The anisotropy can be induced by a laser (e.g., alignment of molecules with the laser polarization) or by an external electric or magnetic field.

Using high-intensity laser pulses for nonlinear generation in a gas tends to ionize the gas to form a plasma. The refractive index of the gas then includes a contribution from the plasma that must be included in the phase-matching condition. Including ionization, the material contribution to the propagation constant $k_{material}$ in a gas is approximately:

$$k_{material} = \frac{2\pi}{\lambda} + \frac{2\pi p\delta(\lambda)}{\lambda} - N_e r_e \lambda \qquad (5)$$

where $N_e$ is the electron density in the plasma and $r_e = e^2/mc^2$ is the classical electron radius. The phase-matching condition is easily modified to account for the ionization-dependent term $N_e r_e \lambda$. Because the pressure and ionization-dependent terms have opposite signs, ionization requires an increased gas pressure for phase matching.

Phase matching at very high intensities is particularly important for the generation of short-wavelength radiation. Very high-intensity laser pulses tend to ionize a gas, and the contribution to $\Delta k_{material}$ from terms involving $\delta(\lambda)$ is small but ionization-dependent terms must be included. In the case of complete ionization and the nonlinear generation process $\omega_s = N\omega_p - M\omega_i$, the phase-matching condition is:

$$0 = \Delta k = \frac{1}{4\pi a^2}[u_s^2\lambda_s + Mu_i^2\lambda_i - Nu_p^2\lambda_p] + N_e r_e[\lambda_s + M\lambda_i - N\lambda_p]$$

For some processes, the phase-matching condition is independent or nearly independent of $N_e$. For example, if $N=2M$, $\lambda_p = \lambda_i/2$, and the signal, pump, and idler propagate with the same modal constant u, then $$\Delta k = \left[\frac{u^2}{4\pi a^2} + N_e r_e\right][N\lambda_p - M\lambda_i + \lambda_s]$$

$$= \left[\frac{u^2}{4\pi a^2} + N_e r_e\right]\lambda_s$$

If the signal wavelength is very short, then phase matching may be satisfactory even though $\leftarrow$k is not zero. Alternatively, slightly tuning either the pump or the idler wavelength can produce phase matching with $\Delta k=0$. For sufficiently short pump and idler pulses, the bandwidth includes wavelength components for which $\Delta k=0$. In this case, phase-matching is achieved independent of gas pressure and free electron density. Waveguide propagation does not contribute to phase matching but does allow a longer interaction length and a smaller beam diameter so that the nonlinear generation process is more efficient. While the preceding analysis pertains to nonlinear generation in the presence of free electrons, the efficiency of nonlinear processes in the presence of other charged particles, such as ions, can be similarly improved For the nonlinear generation process $\omega_s = N\omega_p - M\omega_i$, a coherence length $L_{coherence}$ is defined as an interaction length for which $|\Delta k| L=\pi$. Considering only the contributions of the refractive indices of the nonlinear material at the signal, pump, and idler wavelengths ($n_s$, $n_p$, $n_i$, respectively), the material contribution to $\Delta k$ is:

$$\Delta k_{material} = 2\pi\left|\frac{Nn_p}{\lambda_p} - \frac{Mn_i}{\lambda_i} - \frac{n_s}{\lambda_s}\right|$$

and is associated with a material-coherence length, defined as:

$$L_{material} = \frac{\pi}{\Delta k_{material}} = \frac{1}{2}\left|\frac{Nn_p}{\lambda_p} - \frac{Mn_i}{\lambda_i} - \frac{n_s}{\lambda_s}\right|^{-1}$$

If the nonlinear material is placed in a hollow-core waveguide, the coherence length for the nonlinear process can be much larger than $L_{material}$. The waveguide geometry (size and shape) and the waveguide modes in which the signal, pump, and idler propagate can compensate $\Delta k_{material}$. There are similar material-coherence lengths for other nonlinear processes. Harmonic generation is included by setting M=0 in the above equations.

For a hollow cylindrical waveguide filled with a gas such that $\lambda/a<<1$, the propagation constant k is a sum of a material-dependent quantity and a waveguide-dependent quantity. This represents only a convenient, simple example of phase matching in a waveguide. In general, a propagation constant k in a waveguide is a function of wavelength $\lambda$, material refractive index n, waveguide geometry (size, shape), and the waveguide mode and state of polarization in which the beam propagates, i.e., k=k ($\lambda$, n($\lambda$)), waveguide geometry, mode). Phase matching can be attained in a waveguide by adjusting any of these parameters.

EXAMPLE EMBODIMENT 1

Example Embodiment 1 pertains to the nonlinear generation of sum and difference frequencies by mixing optical radiation at a fundamental frequency $\omega$ ("the fundamental") with optical radiation at a second harmonic frequency $2\omega$ ("the second harmonic"), i.e., mixing radiation at frequencies $\omega$ and $2\omega$ to produce radiation at a sum frequency $3\omega$. For convenience in describing Example Embodiment 1, the second harmonic ($2\omega$) is referred to as the pump ($\omega_p$), the fundamental ($\omega$) as the idler ($\omega_i$), and the sum frequency ($3\omega$) as the signal ($\omega_s$).

Figure 2:
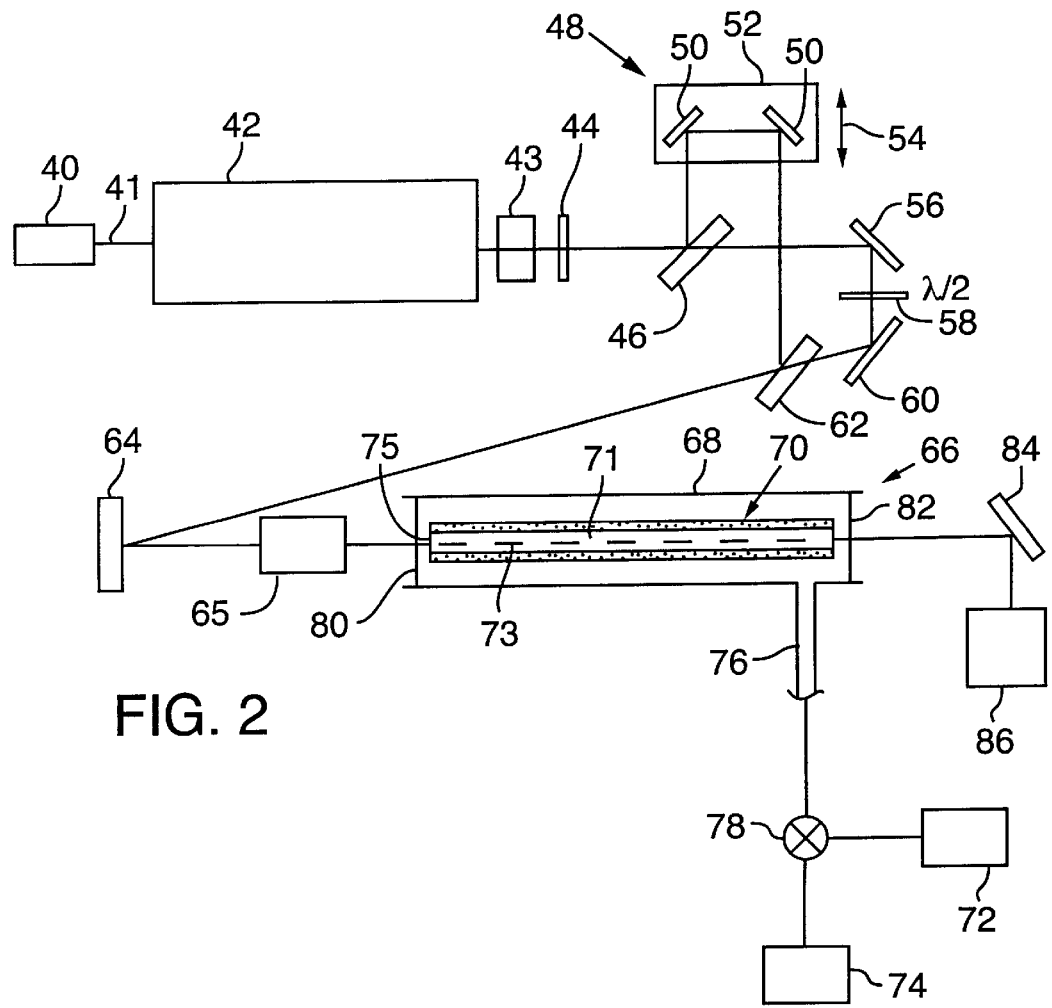
FIG. 2 is a schematic of system for mixing a fundamental frequency and the second harmonic of the fundamental frequency to produce a sum frequency.

With reference to FIG. 2, a laser beam 41 having a center frequency $\omega$ produced by a mode-locked Ti:sapphire laser 40 is incident to a Ti:sapphire amplifier 42. After amplification by the amplifier 42 and compression by a pulse compressor 43, the laser-beam output consists of a 1-kHz repetition rate series of pulses of duration of about 20 fs having pulse energies of about 4 mJ at a wavelength of about 800 nm.

A lithium boron oxide ("LBO") crystal 44 receives the laser beam 41 and converts about 20% of the fundamental into the second harmonic at a wavelength of about $\lambda$=400 nm. The LBO crystal 44 is 100 $\mu$m thick and oriented for birefringent phase matching.

A dichroic beamsplitter 46 receives the combined fundamental and second harmonic. The second harmonic is reflected by the beamsplitter 46 to a path-length compensator 48 that comprises mirrors 50 mounted to a stage 52 that is translatable parallel to an axis 54. The fundamental proceeds through the beamsplitter 46 to a first turning mirror 56, a half-wave retardation plate 58, and a second turning mirror 60. The fundamental and the second harmonic are recombined at a dichroic beamsplitter 62 and focused by a mirror 64 into a nonlinear waveguide apparatus 66.

The nonlinear waveguide apparatus 66 comprises a gas chamber 68 that encloses a hollow-core waveguide 70. The hollow-core waveguide 70 is conveniently made from a 60-cm long section of a glass capillary tube of diameter 6.5 mm and defining a cylindrical cavity 71 of diameter 127 $\mu$m, centered on an axis 73. Gas pressure in the gas chamber 68 is regulated by a gas supply 72 and a vacuum pump 74 that communicate with the gas chamber 68 via a port 76 and a valve 78. Ultraviolet-grade fused silica windows 80, 82 are provided to permit radiation to enter and exit the gas chamber 68. In Example Embodiment 1, the windows 80, 82 are 1.6 mm thick, strong enough to permit pressurization and evacuation of the chamber gas 68.

The nonlinear waveguide apparatus 66 is arranged so that the fundamental and second harmonic enter the gas chamber 68 through the window 80, and radiation produced by nonlinear generation exits via the window 82. The mixed fundamental, second harmonic, and signal radiation exiting the nonlinear waveguide apparatus 66 are directed to a dichroic mirror 84 that reflects the signal to a radiation detector 86 and transmits the fundamental and the second harmonic.

In operation, the 800-nm pulses from the Ti:sapphire laser 40 are amplified by the Ti:sapphire amplifier 42 and frequency-doubled in the LBO crystal 44. The wavelength of the second harmonic is one-half that of the fundamental, or about 400 nm. The LBO crystal 44 is oriented so that the second harmonic is orthogonally polarized with respect to the fundamental. The dichroic beamsplitter 46 separates the fundamental and the second harmonic and the half-wave retarder 58 changes the polarization direction of the second harmonic so that the polarization direction is parallel to the polarization direction of the fundamental. Arranging the fundamental and second harmonic in the same polarization state permits more efficient mixing of the two wavelengths in the nonlinear waveguide apparatus 66.

The fundamental and second harmonic are recombined at the dichroic beamsplitter 62 and focused into the hollow-core waveguide 70 by the concave mirror 64. In Example Embodiment 1, about 35% and 10% of the second harmonic and fundamental, respectively, are transmitted by the hollow-core waveguide 70.

The cavity 71 of the hollow-core waveguide contains, e.g., either argon or krypton at a pressure determined by the valve 78. In an isotropic material such as a gas, the lowest-order nonlinear susceptibility is the third-order susceptibility $\chi^{(3)}$, so that the nonlinear generation process producing the sum frequency (3ω) uses two pump photons to create one idler photon and one signal photon, i.e., $3\omega=2\omega+2\omega-\omega$, or $\omega_p=2\omega_s-\omega_i$. Phase matching this process is accomplished by adjusting the gas pressure in the gas chamber 68.

Figure 3A:
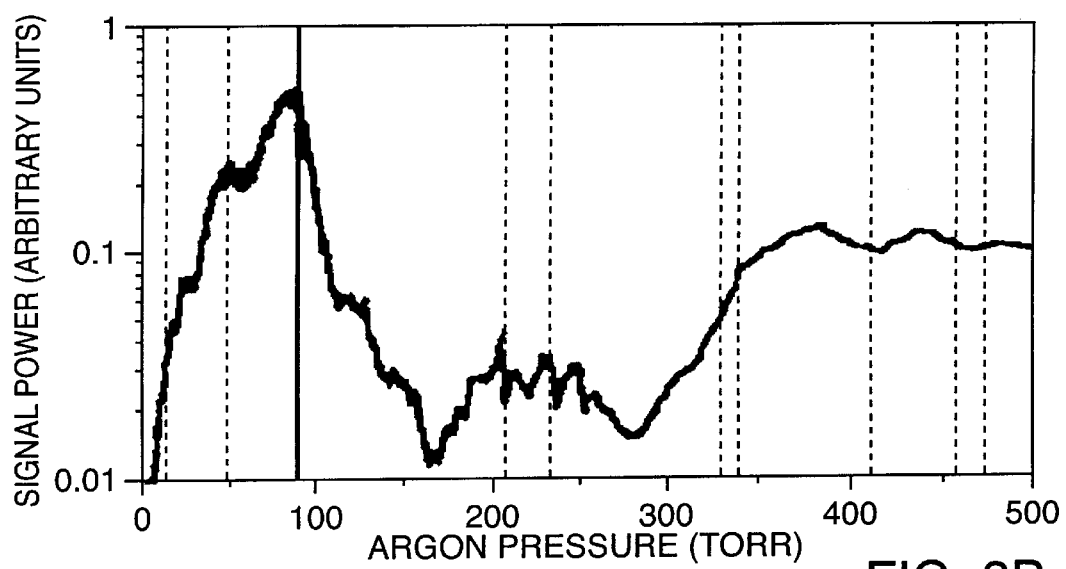
FIG. 3A is a graph depicting the relative power generated at a signal frequency using the apparatus of FIG. 2 as a function of argon pressure.
Figure 3B:
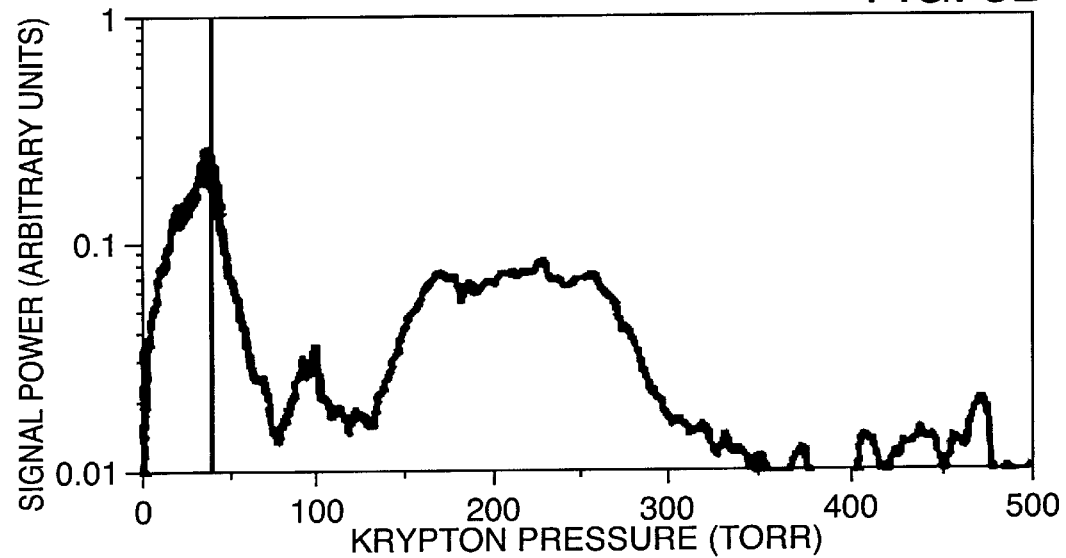
FIG. 3B is a graph depicting the relative signal power generated at a signal frequency using the apparatus of FIG. 2 as a function of krypton pressure.

With reference to FIGS. 3A–3B, the maximum signal power occurs at an argon pressure of 85.1 Torr or at a krypton pressure of 38.9 Torr. Calculated optimum pressures for argon and krypton are 89.7 Torr and 39.2 Torr, respectively, for the lowest-order waveguide mode. Additional peaks shown in FIGS. 3A–3B correspond to sum or difference frequency generation involving higher-order waveguide modes. In FIG. 3A, calculated phase-matching pressures for some higher-order modes are indicated with dashed vertical lines; in FIGS. 3A–3B, the calculate phase-matching pressures of the lowest-order mode are marked indicated with solid vertical lines. With pump and idler pulse energies of 30 µJ and 64 µJ, respectively, exiting the waveguide 70, the signal pulse energy is as large as about 10 µJ with the waveguide 70 containing argon at the optimum pressure.

Figure 4:
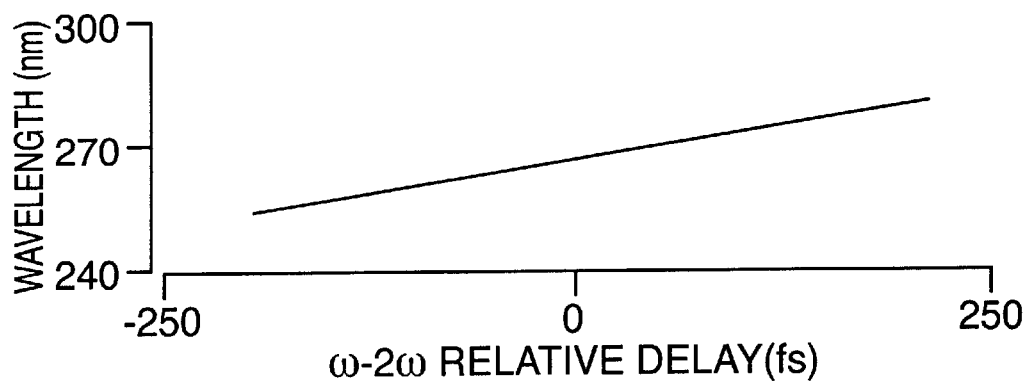
FIG. 4 is a graph of signal wavelength as a function of a relative delay between the pump and the idler.

FIG. 4 shows the spectrum of the signal as a function of the delay between the pump and the idler with the compressor 43 adjusted for maximum pump power, producing a 62 fs chirp of the pump. (Precompensation of this chirp increases the signal output.) By adjusting the delay between the pump and idler, the output wavelength of the signal can be tuned about 8 nm. If the pump precedes the idler, the short-wavelength portion of the pump is mixed with the long-wavelength portion of the idler so that the signal is shifted to a shorter wavelength. If the idler precedes the pump, the long-wavelength portion of the pump is mixed with the short-wavelength portion of the idler, thereby shifting the signal to a longer wavelength.

Figure 5:
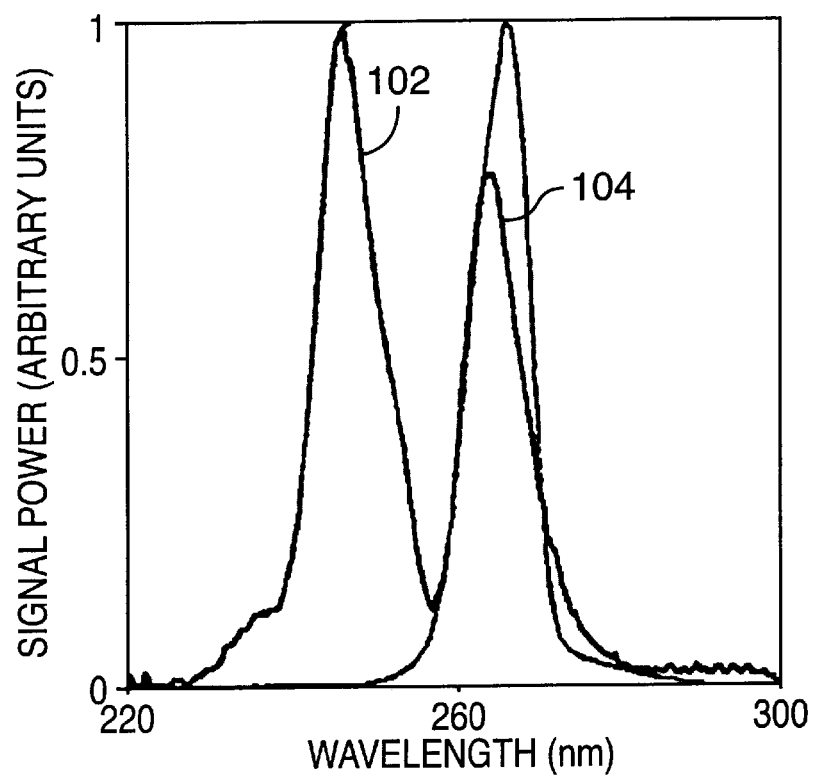
FIG. 5 is a graph of the spectrum of the signal with the pulse compressor of FIG. 2 adjusted for maximum pump power or shortest pump pulses.

The compressor 43 is adjustable to produce either maximum signal power or the shortest signal pulses. With reference to FIG. 5, the signal spectrum with the compressor 43 adjusted for maximum signal power or shortest signal pulses is shown as curves 102, 104, respectively. The spectral widths of the signal pulses are 8.5 nm and 26 nm, respectively. In addition, these signal pulses are compressible with transform limits of about 9.5 fs and 4.5 fs, respectively.

The mirror 64 focuses the idler and the pump into the hollow-core waveguide 70. As noted above, phase matching and waveguide loss depend on the waveguide mode. In addition, intense laser beams are preferably focused at the aperture of the hollow-core waveguide 70 and propagate along an axis 73 of the waveguide 70. If the laser beam 41 is not properly focused or is misaligned, then the waveguide 70 can be damaged or excessive power lost as the laser beam 41 propagates through the hollow-core waveguide 70.

Figure 6A:
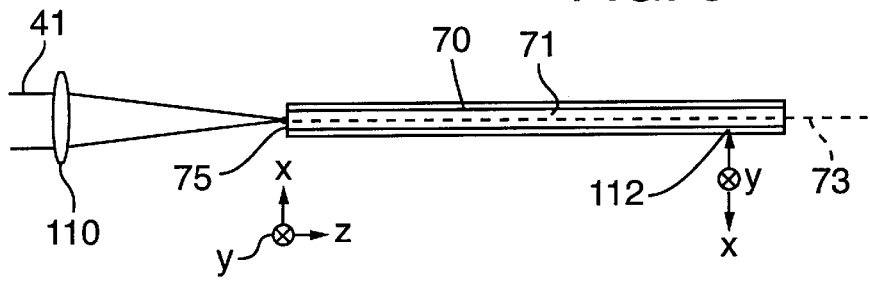
FIGS. 6A–6B are schematic views of optical layouts for aligning a laser beam with a waveguide.
Figure 6B:
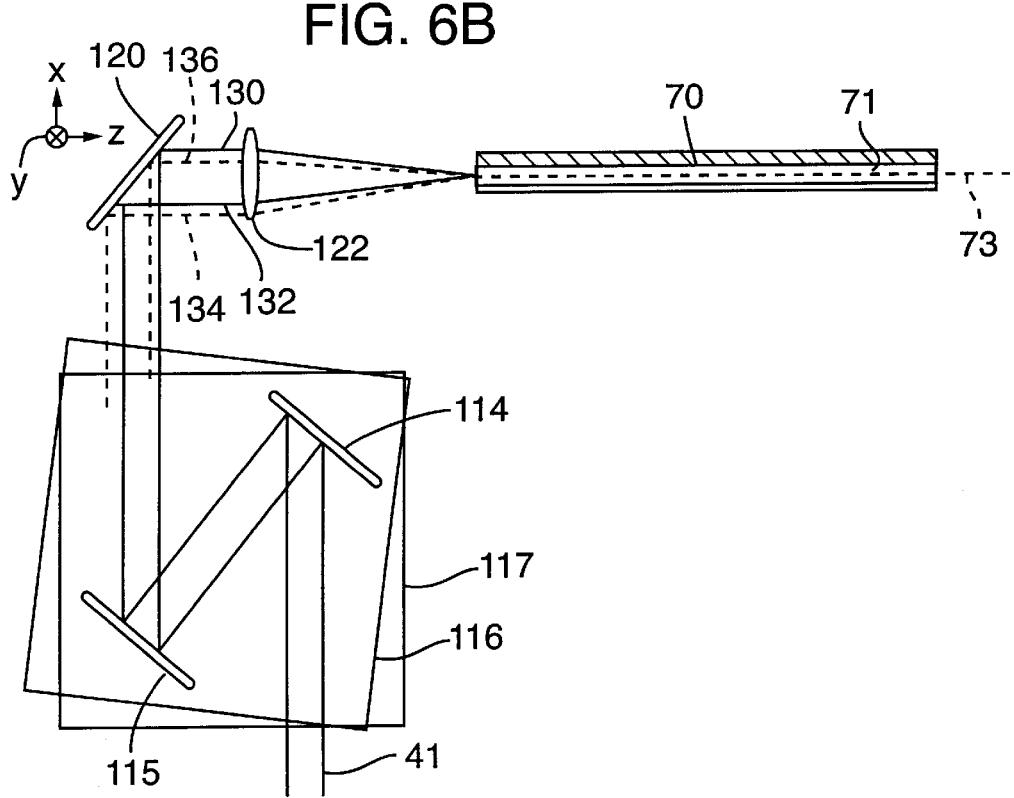

Two methods of aligning the laser beam 41 with respect to the hollow-core waveguide 70 are illustrated in FIGS. 6A–6B. With reference to FIG. 6A, the laser beam 41 is focused by a lens 110 (or a focusing mirror) into the hollow-core waveguide 70. The input aperture 75 of the waveguide 70 is adjustable along xyz coordinate axes so that the laser beam 41 is centered on the cavity 71 at the input aperture 75. The waveguide 70 is also adjustable along the x- and y-axes at an adjustment point 112. Translating the adjustment point 112 while holding the input aperture 75 fixed aligns the propagation direction of the laser beam 41 and the waveguide axis 73.

Alternatively, proper focusing and alignment is obtainable without moving the hollow-core waveguide 70. With reference to the embodiment shown in FIG. 6B, two mirrors 114, 115 are attached to a stage 116 that is tiltable with respect to the xz-plane and the yz-plane. The mirrors 114, 115 direct the laser beam 41 to a turning mirror 120 and a lens 122 (or a focusing mirror). The lens 122 is adjusted so that the laser beam 41 is focused and centered on the aperture 75. The propagation direction of the laser beam 41 is aligned with the axis 73 by adjusting the stage 116. Before adjustment, the laser beam 41 strikes the lens 122 and is incident to the waveguide 70 within a region defined by lines 130, 132. After adjustment, the stage 116 is tilted to a position 117 and the laser beam 41 propagates in a region defined by the dashed lines 134, 136. The relative orientation of the mirrors 114, 115 is fixed so that the mirrors 114, 115 displace the laser beam 41 at the lens 122 without changing the direction of propagation. Because the direction of propagation is unchanged, the laser beam 41 remains properly focused and centered on the aperture 75. The displacement of the laser beam 41 at the lens 122 changes the direction of propagation of the laser beam 41 with respect to the axis 73 so that adjusting the stage 116 permits aligning the propagation direction of the laser beam 41 with the axis 73.

Other nonlinear processes can also be carried out with the apparatus of FIG. 2. With reference to FIG. 7A, a signal frequency can be generated such that $\omega_s=3\omega_p-2\omega_i$. Signal power for this process is plotted as a function of wavelength as curve 141 in FIG. 7C using argon at an optimum pressure. Similarly, a tunable parametric oscillator providing a tunable idler permits tuning the signal. With reference to FIG. 7B, a signal frequency $\omega_s=2\omega_p-\omega_i$ is produced and varying the idler frequency tunes the signal frequency $\omega_s$. Signal power as a function of wavelength is plotted as curves 142, 143, 144, 145 for idler wavelengths of 2200 nm, 1280 nm, 800 nm, 670 nm, respectively, using argon at optimum pressures.

EXAMPLE EMBODIMENT 2

Example Embodiment 2 pertains to third-harmonic generation directly from a fundamental, i.e. $\omega_s=3\omega_p$. The arrangement is similar to that shown in FIG. 2, but only the fundamental ($\omega$) is coupled to the waveguide 70. A glass capillary tube with an inside diameter of 153 $\mu$m and a length of 30 cm serves as the waveguide 70; the waveguide 70 transmits about 46% of the incident fundamental. Power in the third harmonic at a wavelength of about 267 nm is maximized at an argon pressure of 55 Torr, close to the calculated optimum pressure of 61 Torr obtained using Equation 4 above. The nonlinear process $\omega_s=3\omega_p$ corresponds to N=3, M=0, and R=1. If the pump is the lowest-order mode ($EH_{11}$), the lowest-order mode that phase matches is the $EH_{13}$ mode.

EXAMPLE EMBODIMENT 3

Example embodiment 3 pertains to high-harmonic generation ("HHG") in a gas. Conventional crystalline nonlinear optical materials are not suitable for HHG because of their low transmittances to short-wavelength radiation. Gases transmit wavelengths as short as 50–100 nm, and are suitable for HHG. For convenience, HHG, as used herein, refers to the generation of harmonics of a fundamental frequency $\omega$ of order N=9 or higher, i.e., harmonic frequencies >9$\omega$. Phase matching for HHG corresponds to N>9, M=0, R=1 in Equation 4.

Figure 8A:
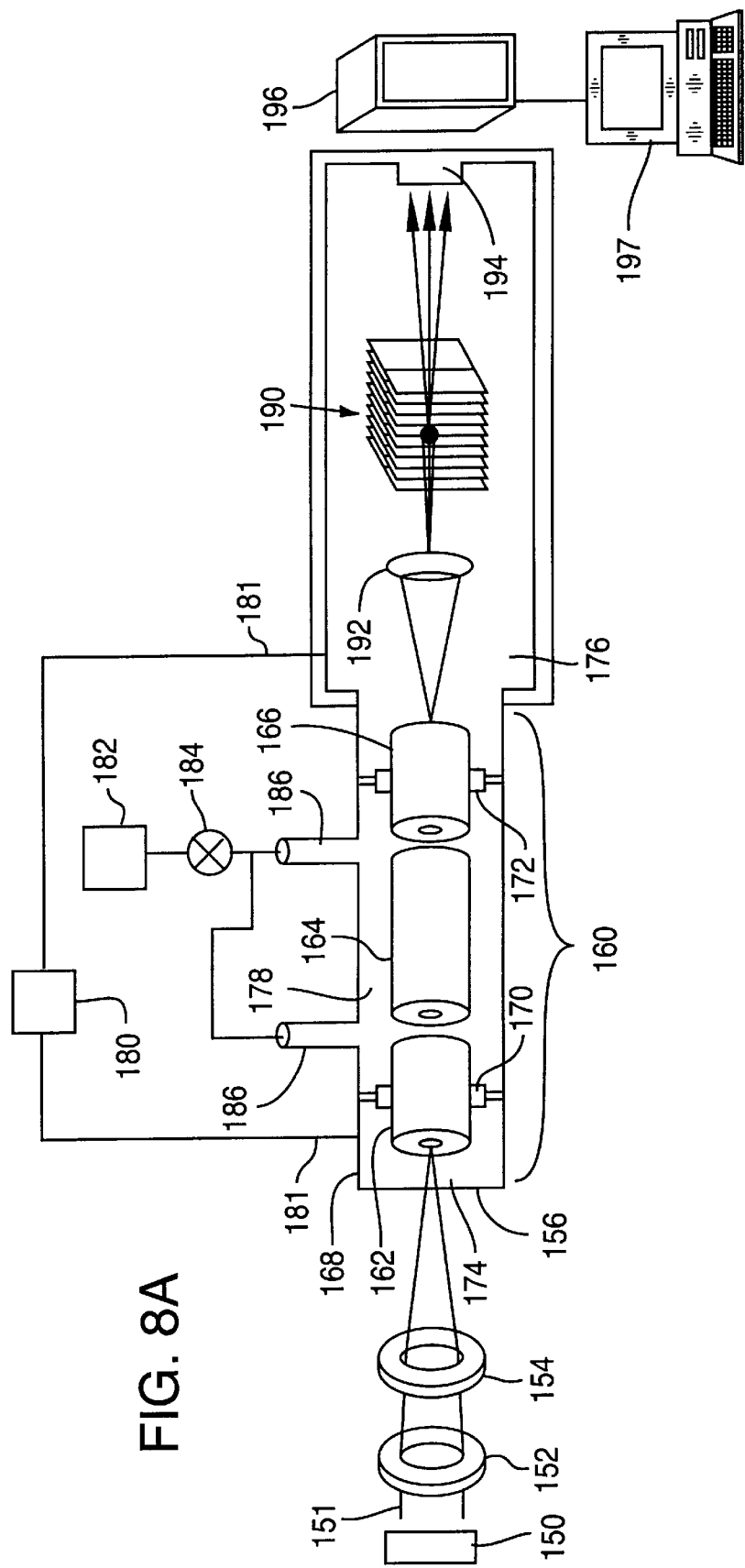
FIGS. 8A–8F are a schematic diagrams of waveguide systems comprising a plurality of waveguide sections.

With reference to FIG. 8A, a mode-locked Ti:sapphire laser amplifier system 150 comprises a Kerr-lens mode-locked oscillator and two multipass laser amplifier stages. The laser amplifier system 150 is capable of generating 800-nm pulses having 4.5-mJ pulse energies and 17-fs pulse durations at a 1-kHz repetition rate. In Example Embodiment 3, the output of the laser amplifier system 150 is adjusted to provide a beam 151 comprising pulses having 100–300 $\mu$J pulse energies and 20-fs pulse durations. The output is focused by a 300-mm focal length fused silica lens 152 through an aperture 154 and a sapphire window 156 into a three-stage hollow waveguide system 160. The waveguide system 160 comprises three hollow-core waveguides 162, 164, 166, mounted with a chamber 168. Gas seals 170, 172 are associated with respective waveguides 162, 166 and divide the chamber 168 into vacuum regions 174, 176 and a gas-filled region 178. A vacuum pump 180 partially evacuates regions 174, 176 through flexible couplings 181.

The laser beam 151 is focused to a 50-$\mu$m beam radius at the waveguide 162. A supply 182 delivers a nonlinear material, typically a gas, to the region 178 though a valve 184 and flexible couplings 186. The waveguide system 160 permits a relatively high constant gas pressure within the waveguides 162, 164, 166, while greatly restricting the flow of gas into the vacuum regions 174, 176 at either end. The vacuum region 174 permits the laser pulses to enter the waveguide 162 without ionization-induced defocusing caused by gas in the region 174. The vacuum region 176 permits the exiting high-harmonic radiation to propagate without attenuation in the gas. For HHG in particular, air or other gases can be absorbing and it is advantageous to place a waveguide in the chamber in which the high-harmonic radiation is to be used. Other optical elements such as focusing and beam-combining optics can also be placed in the same chamber. Because the waveguides 162, 164 restrict gas flow into the vacuum regions 174, 176, the vacuum pump 180 can have a low pumping rate.

The waveguides 162, 164, 166 are conveniently made of sections of glass capillary tube having 150-$\mu$m inside diameter and 6.3-mm outside diameter. The waveguides 162, 164, 166 and are held in a V-groove with approximately 1-mm spacing. The V-groove aligns the waveguides 162, 164, 166 to reduce loss as the laser beam 151 passes from one waveguide to another. The waveguides 162, 164, 166 are 1.7 cm, 3 cm, and 1.7 cm long, respectively.

The flexible couplings 181 allow the waveguide system 160 to move for alignment with the laser beam 151. The input aperture 152 adjusts the diameter of the laser beam 151 to match the lowest-order mode of the waveguides 162, 164, 166. Proper alignment of the laser beam 151 reduces laser damage to the waveguides 162, 164, 166.

Radiation emerging from the waveguide 166 is directed to an imaging grazing-incidence spectrometer 190 through a 0.2-$\mu$m thick aluminum filter 192 that transmits only the 11th through 45th harmonics. The radiation pattern of the transmitted harmonics is imaged with an imager 194 that comprises a microchannel plate and a phosphor screen. The image is either viewed with a charge-coupled device (CCD) camera or the image signal at the phosphor is directed to a photodetector.

Figure 9:
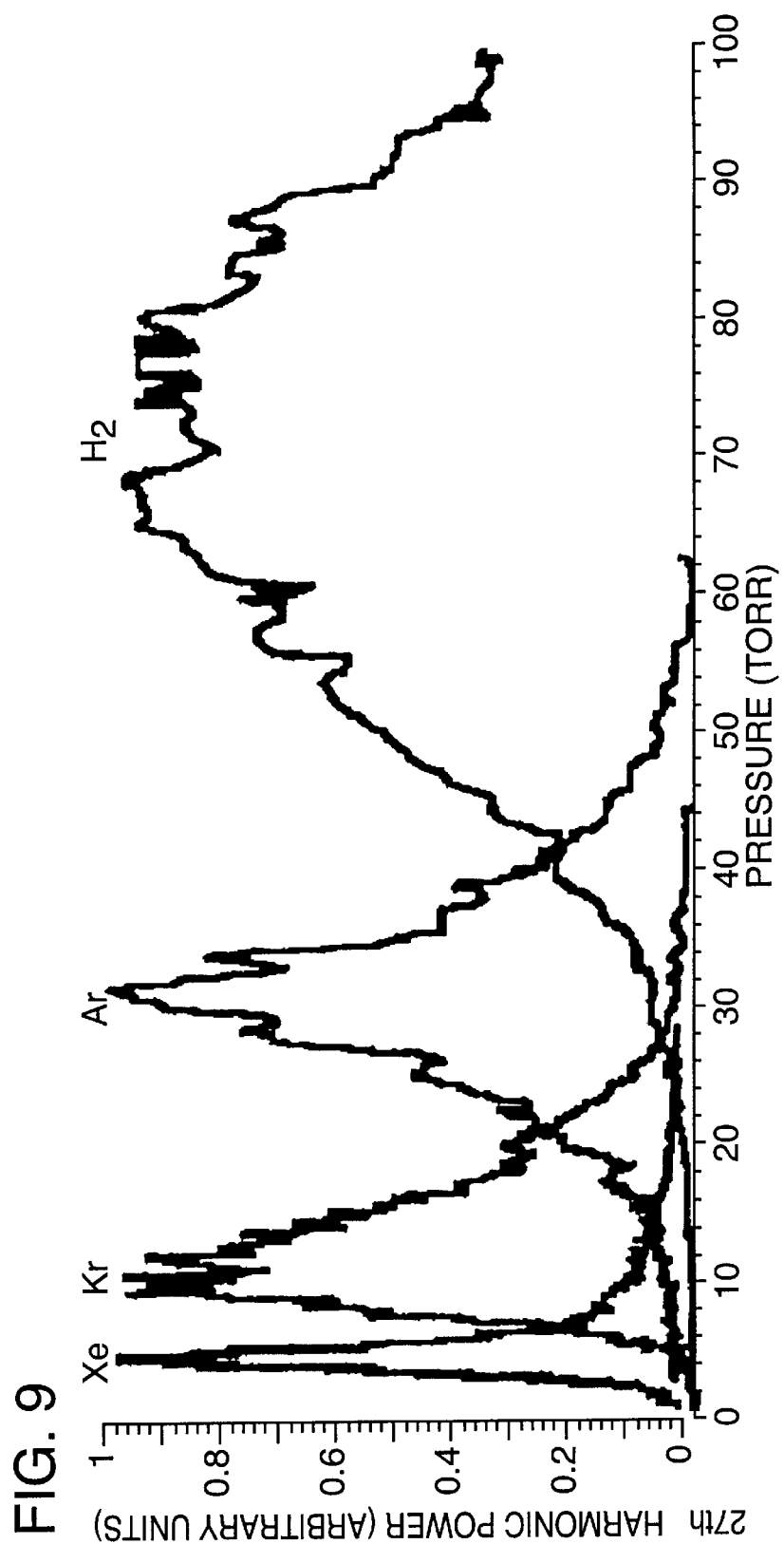
FIG. 9 contains plots of harmonic power in the 27th harmonic as a function of pressure for Xe, Kr, Ar, and $H_2$.
Figure 10:
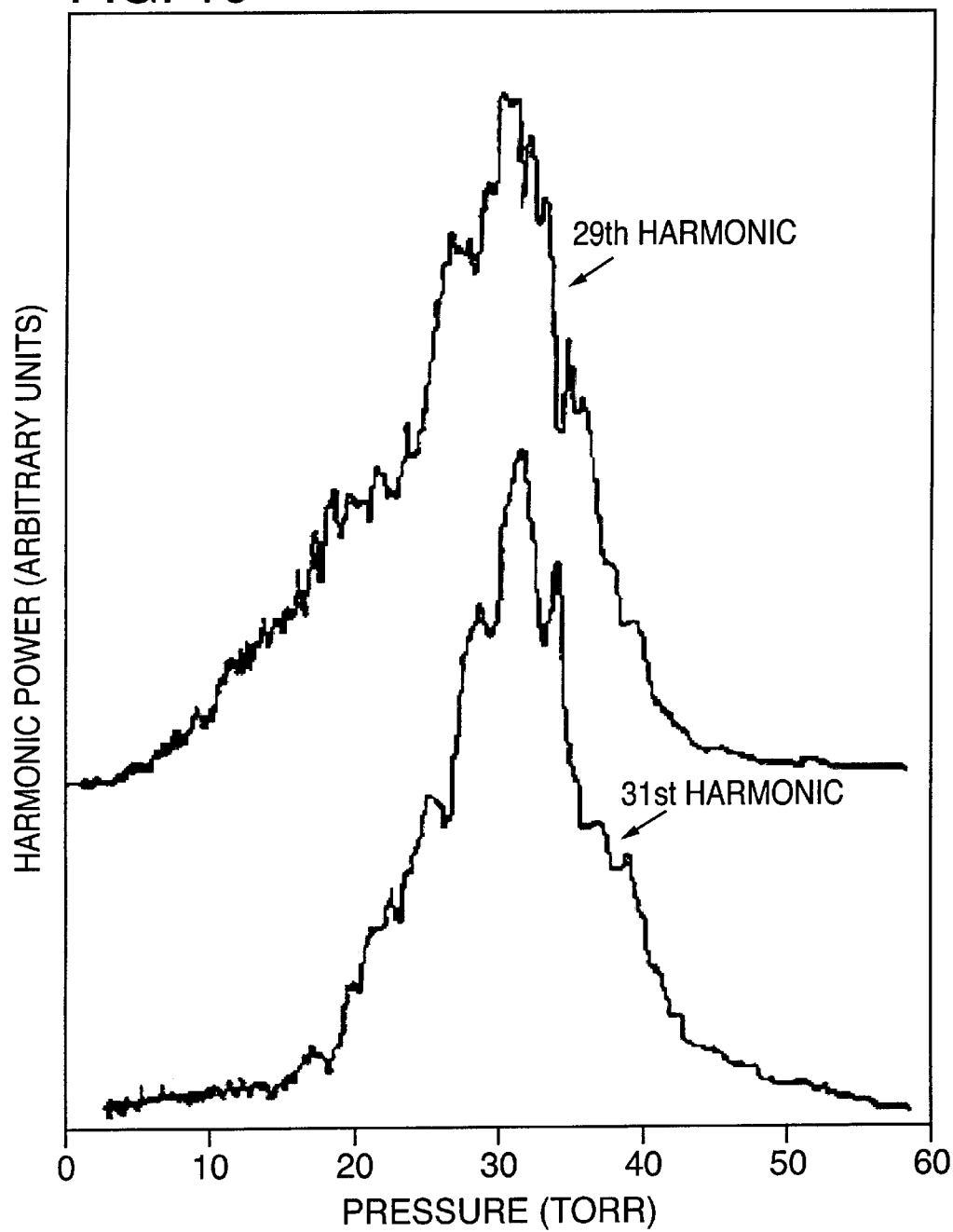
FIG. 10 contains plots of harmonic power in the 29th and 31st harmonics as a function of pressure for argon.

The valve 184 adjusts gas pressure in the gas region 178 for phase matching. With reference to FIG. 9, signal power in the 23rd–29th harmonics (a wavelength of about 30 nm) is plotted as a function of gas pressure for xenon, krypton, argon, and hydrogen. The optimum gas pressures differ for the various gases due to differences in the dispersions (5) of the gases. With reference to FIG. 10, signal power for the 29th and 31st harmonics of 800 nm (wavelengths of about 28 nm and 26 nm, respectively) are plotted as a function of pressure for argon.

Figure 11A:
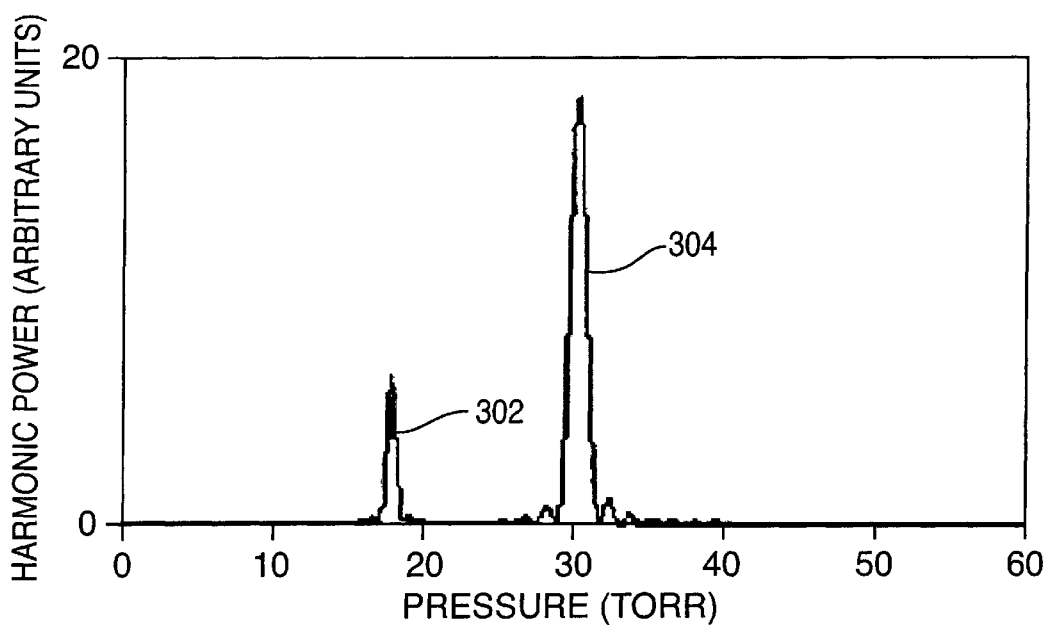
FIGS. 11A–11B contain graphs of calculated power in the 29th harmonics as a function of argon pressure with and without 2% gas ionization.
Figure 11B:
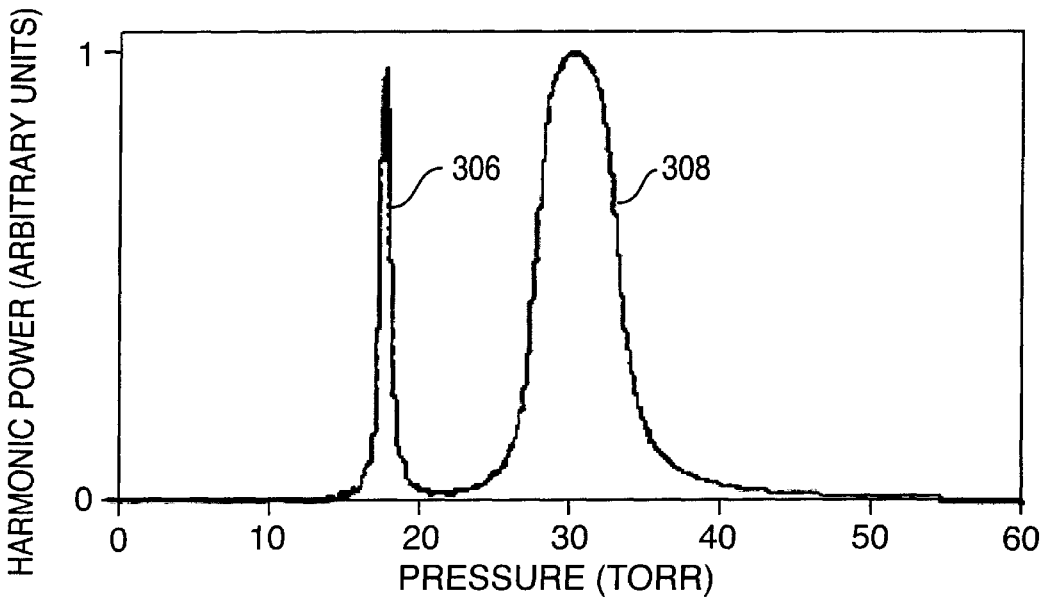

The efficiency of HHG depends on absorption and ionization in the nonlinear material. Referring to FIG. 11A, calculated 29th harmonic power is plotted as a function of argon pressure as a curve 302, without considering either absorption or ionization. The 29th harmonic power as a function of argon pressure with 28 ionization is shown as a curve 304. 29th harmonic power as a function of gas pressure in the presence of absorption is shown as a curve 306 in FIG. 11B. The 29th harmonic power as a function of argon pressure with absorption and a varying level of ionization of about 2% is shown as a curve 308. Ionization shifts the phase-matching pressure to a higher pressure while absorption in the gas reduces the harmonic power. Past a critical value of fractional ionization, phase matching is no longer possible because the effect of the plasma refractive index is greater than that of the remaining neutral gas. The use of shorter laser pulses permits the intensity required to generate a particular harmonic is reached before the critical value of ionization is reached.

At argon pressures between 30 and 50 Torr, one or more of the harmonics of order 23, 25, 27, 29, 31 are phase matched. However, the optimum phase-matching pressure for each harmonic is slightly different because the higher harmonics are generated at higher values of ionization. Harmonics of order less than 23 are absorbed in argon. Higher harmonic orders (greater than 33) are phase matched at still higher pressures.

The imager 194 images the signal power in harmonics of order 23, 25, 27, 29, 31 exiting the waveguide 166. If the harmonic process is phase matched, the harmonic forms an approximately diffraction-limited beam. At low pressures, harmonic generation is not well phase matched and harmonic generation is not associated with any one particular mode of the waveguide, and the beam quality is poor.

Harmonics of order of at least 299 (i.e., wavelengths less than 3 nm) can be generated using very short laser pulses and nonlinear ionization of the nonlinear material. While ionization is generally believed to prevent phase matching over interaction lengths greater than about 50 $\mu$m, phase matching in waveguides such as the waveguides 162, 164, 166 permits interaction lengths of many centimeters. In some cases, phase matching for high-order nonlinear frequency generation is independent of the extent of ionization.

In Example Embodiment 3, a high harmonic is generated in a single nonlinear process. Multiple stages of nonlinear generation can also be used to generate high harmonics, with each stage phase matched in a waveguide. If the pulse energy after one stage of generation is too low for efficient nonlinear generation in a subsequent stage, the generated pulses can be amplified in materials such as Ce:LiCAF that exhibit gain in the UV. The amplified pulses are then used in another stage.

Because gases are used as the nonlinear material, optical damage is not problematic even with high input intensities. The nonlinear waveguide is simple and inexpensive. Conversion efficiencies are high because the waveguide phase matches and confines the optical radiation, permitting long interaction lengths for nonlinear generation. Radiation at many wavelengths can be generated; the wavelengths are limited primarily by the frequencies available as inputs and the transmittance of the nonlinear material.

In addition, the phase-matching bandwidth of hollow-core waveguides containing a nonlinear material is large. Short pulses that have large spectral bandwidths are converted into short pulses with similarly large spectral bandwiths. In contrast, conventional phase-matching techniques permit conversion of only a portion of the spectrum of a short pulse, increasing the pulse duration.

Even for long duration pulses, hollow-core waveguides are advantageous for phase-matching nonlinear generation. Hollow-core waveguides permit long interaction lengths and small beam radius, so that nonlinear generation is efficient.

While phase matching is easily accomplished by adjusting the pressure of the nonlinear material, phase matching can be accomplished by selecting a gas pressure and a material dispersion and then selecting the radius of the waveguide. For example, a waveguide radius can be selected for phase matching at standard pressure.

Figure 8B:
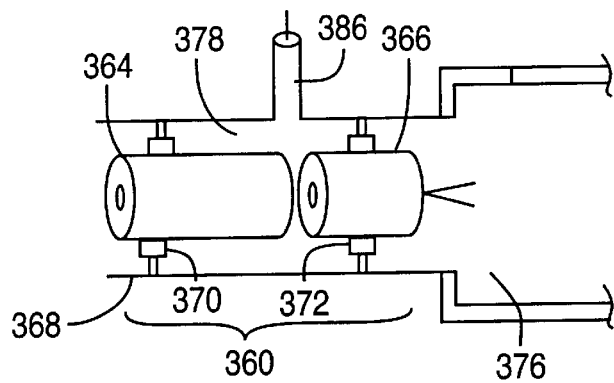

With reference to FIG. 8B, an alternative waveguide system 360 comprises two hollow-core waveguides 364, 366 mounted within a chamber 368. Gas seals 370, 372 are associated with respective waveguides 362, 366 and form a gas-filled region 378. A gas supply (not shown in FIG. 8B) delivers a gas to the region 378 through an inlet 386. Gas exits the region 378 through the waveguides 364, 366. In this waveguide system, input optical radiation enters the waveguide 364 through a gas (such as the nonlinear material or standard atmosphere) while a region 376 is evacuated.

Figure 8C:
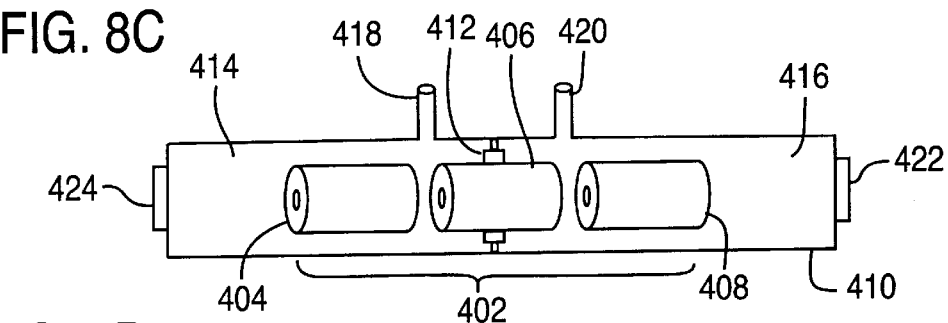

With reference to FIG. 8C, a waveguide system 402 comprises waveguide sections 404, 406, 408 mounted within a chamber 410. A gas seal 412 divides the chamber 410 into sections 414, 416 that connect to respective inlets 418, 420. Because the chamber 410 is divided, waveguide sections 404, 408 can be held at different pressures. Waveguide section 406 restricts the flow between the waveguide sections 404, 408 and permits a laser beam to propagate between the regions 414, 416. Windows 422, 424 are provided to permit radiation to enter and exit the chamber 410.

Figure 8D:
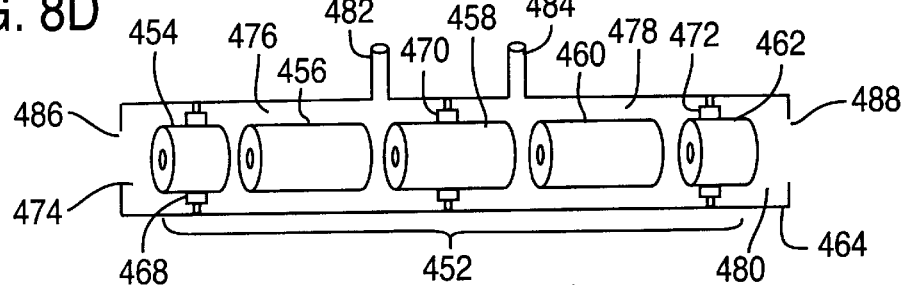

With reference to FIG. 8D, a waveguide system 452 comprise waveguide sections 454, 456, 458, 460, 462, mounted in a chamber 464. Gas seals 468, 470, 472 divide the chamber 464 into regions 474, 476, 478, 480. Regions 476, 478 are in communication with respective inlets 482, 484 for pressurization. Regions 474, 480 are vacuum regions and apertures 486, 488 are provided for radiation to enter and exit the waveguide system 452. Waveguide sections 456, 460 are at constant (but generally different) pressures while waveguide sections 454, 458, 462 have pressure gradients. The waveguide sections 454, 458, 462 permit radiation to pass between the various regions while minimizing gas flow.

Figure 8E:
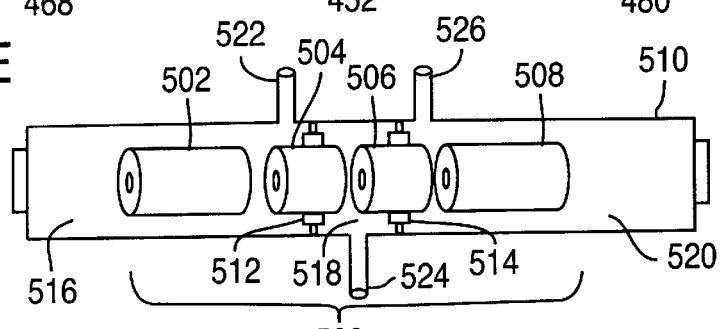
Figure 8F:
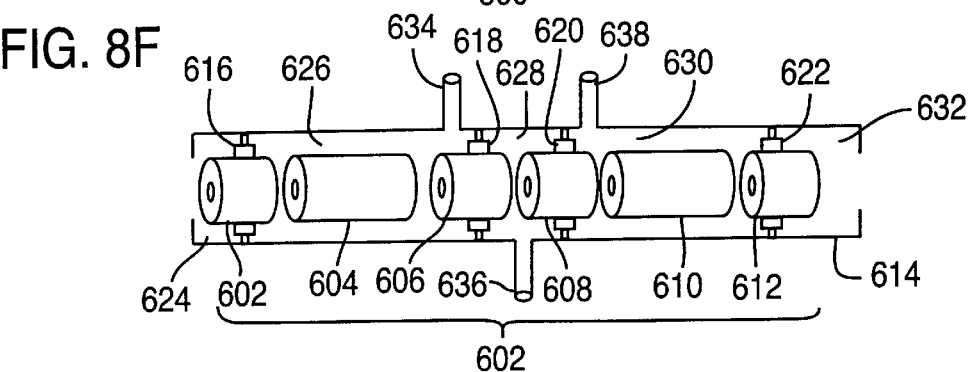

With reference to FIG. 8E, a waveguide system 500 comprises waveguide sections 502, 504, 506, 508, mounted with a chamber 510. Gas seals 512, 514 divide the chamber 510 into regions 516, 518, 520 that are in communication with respective gas ports 522, 524, 526. The regions 516, 518, 520 can be held at different pressures. For example, the region 524 can be evacuated while regions 522, 526 are adjusted to pressures for phase matching.

With reference to FIG, 8F, a waveguide system 602 comprises waveguide sections 604, 606, 608, 610, 612 mounted in a chamber 614. Gas seals 616, 618, 620, 622 divide the chamber 614 into regions 624, 626, 628, 630, 632. Ports 634, 636, 638 connect to respective regions 626, 628, 630 and are held at constant gas pressures, adjusted for phase matching.

If multiple waveguide sections at different pressures are used, waveguide sections with seals on the waveguide exterior provide transitions from one pressure to another while minimizing gas flow. A hole can be provided in the waveguide to permit gas flow into the waveguide cavity. Alternatively, collinearly aligned waveguide sections can be used, separated by no more than the Rayleigh range of the guided light. Any waveguide section exposed to the same pressure at both ends has a constant pressure inside. If there is a pressure difference between the two ends, then there is a pressure gradient. This pressure gradient generally precludes phase matching, but a tapered waveguide cavity permits phase matching even with a pressure gradient.

While the embodiments described above use odd-order susceptibilities $\chi^{(2n+1)}$, n>1, nonlinear generation can be performed using the even-order susceptibilities, but only anisotropic materials have even-order susceptibilities that are not zero. Phase matching in hollow-core waveguides is not restricted to phase matching $\chi^{(3)}$ processes. If nonlinear generation does not produce sufficient power, this sum, difference, or harmonic frequency can be amplified in amplifier materials such as Ce:LiCAF. The amplified frequencies can then be used as the pump in a subsequent nonlinear generation process.

Resonances in the gas can also be used, both for phase matching and for enhancement of the nonlinearity. If a nonlinear generation process uses frequencies above and below a resonance frequency, then the refractive index exhibits both normal and anomalous dispersion, facilitating phase matching. Although the use of resonances generally restricts the spectral bandwidth of the nonlinear process, for longer input and output pulses the efficiency can be improved.

While a glass capillary tube is a convenient, inexpensive waveguide, a metal tube can also serve as a hollow-core waveguide. Other suitable waveguide materials include sapphire, quartz, and silicon. Coating can be placed on the inside of the waveguide to improve or alter its transmission characteristics. In addition, the waveguide propagation constant depends on cross-sectional dimensions of the waveguide, i.e., dimensions of the waveguide in directions perpendicular to the direction of propagation in the waveguide.

Any radial or azimuthal dependence of the index of refraction of the material disposed in a waveguide cavity can alter the mode structure and propagation constants of the waveguide. This structure can be controlled either with a guided beam that precedes the nonlinear generation or by one or more of the beams used in the nonlinear process. Possible mechanisms for providing such a radial or azimuthal dependence include ionization, an intensity-dependent refractive index, photo-disassociation, photo-chemical reactions, or alignment of molecules with respect to the polarization state of the pump or idler.

Many waveguide structures are possible. With reference to FIG. 12A, a waveguide 200 comprises a tapered cylinder 202 that defines a tapered central cavity 204. The waveguide 200 comprises sections 205, 206 having different radii so that the modal contributions to the propagation constant differ. Provided that the rate of change of the waveguide radius is slow compared to the Rayleigh range ($z_0 = \pi w^2/\lambda$) of the beam, a tapered section adjusts the guided mode diameter efficiently. The waveguide 200 permits phase matching different nonlinear processes in sections 205, 206. For example, high-harmonic generation is achievable with successive harmonic-generation processes in the sections 205, 206 of the tapered waveguide 200. The radii of the sections 205, 206 are selected along with the gas pressure in the cavity 205 so that a nonlinear generation process is phase matched in the section 205 and a second nonlinear generation process (using the signal produced by the first process) is phase matched in the section 205. Additional sections can be provided for phase matching additional processes. This applies to the successive phase matching of other parametric processes.

With reference to FIG. 12B, a waveguide 210 comprises a cylindrical shell 212 defining a tapered cavity 214. The waveguide 210 also permits phase matching two nonlinear processes. Tapered waveguides having multiple sections of different radii permit phase matching of a plurality of nonlinear processes at a single gas pressure. An outer surface 215 can be roughened to prevent the interaction of reflections for the outer surface 215 with radiation propagating in the cavity 214.

While cylindrically symmetric waveguides are simple to make, waveguides having noncircular cross-sections also permit phase matching. With reference to FIG. 12C, a waveguide 220 comprises a shell 222 having a rectangular cross-section and defining a rectangular waveguide cavity 224. The waveguide 220 has different propagation constants for radiation polarized along the short and long axes of the rectangular cross-section. The waveguide contribution $k_{mode}$ for the waveguide 220 can be calculated or the refractive index of a nonlinear material disposed in the cavity 224 can be adjusted to establish the phase-matching condition.

With reference to FIG. 12D, a waveguide 230 comprises a cylindrical shell 232 that defines a cylindrically symmetric cavity 234 having a radius that varies periodically along an axis 236. This waveguide permits quasi-periodic phase matching in which phase errors (due to $\Delta k \neq 0$) increase and decrease periodically.

With reference to FIG. 12E, a waveguide 240 comprises a cylindrical shell 242 that defines a cylindrically symmetric, axially periodic waveguide cavity 244. In the waveguide 240, large-diameter sections 246 alternate with narrow-diameter sections 247. Transitions between the sections 246, 247 are abrupt, not tapered. The waveguide 240 permits quasi phase matching.

With reference to FIG. 12F, a waveguide 250 comprises a cylindrical shell 252 that defines a cylindrical cavity 254. An inlet 256 is provided for introducing a nonlinear material into the cavity 254. The nonlinear material exits the cavity 254 at waveguide apertures 257, 258, or an outlet can be provided. In addition, the example embodiments pertain to the generation of short wavelengths (<300 nm), but the methods and apparatus are equally applicable to longer wavelengths, including visible, infrared, far infrared, and microwave wavelengths.

With reference to FIG. 13, a waveguide 270 defines a cavity 272 in communication with an inlet 280 and an outlet 281. Containers 274, 276 contain fluids 284, 286, respectively, and a mixing valve 278 controls the mixture of the fluids 284, 286 supplied to the cavity 272. The fluid mixture serves as a nonlinear material.

The refractive indices of liquids do not generally vary appreciably as a function of pressure, but a mixture of liquids has a refractive index that depends on the relative proportions of its component liquids. In order to phase match a nonlinear process in the waveguide 272, the mixing valve 278 is adjusted to maximize the power produced by a selected nonlinear process. Alternatively, phase matching in a liquid can be achieved by adjusting the pressure, pH, temperature, or concentration of a solute dissolved in the liquid. If the containers 302, 304 supply gases, then phase matching is achieved by adjusting the gas mixture or, alternatively, the gas pressure.

Very high intensity laser beams change the refractive indices of the materials in which the beams propagate. These intensity-induced refractive index changes can be compensated in a hollow-core waveguide so that phase matching is maintained. Because of the Guoy phase shift, the efficiency of harmonic generation $\omega_s = N\omega_p$ is exactly zero for $\Delta k = 0$ and $N > 2$ in the tight-focusing limit. See, e.g., Boyd, *Nonlinear Optics*, Academic Press, Inc., 1992. In a hollow-core waveguide, intensities equivalent to tight focusing are obtained but without the Guoy phase shift. Hence, conversion efficiencies for $N > 2$ can be large.

Whereas the invention has been described in connection with preferred embodiments, it will be understood that the invention is not limited to those embodiments. On the contrary, the invention is intended to encompass all alternatives, modifications, and equivalents as may be included within the spirit and scope of the invention as defined by the appended claims.

We claim:

1. A method for nonlinear generation of a signal, comprising:

providing a waveguide that defines a waveguide cavity, the waveguide having a propagation constant $k_{mode}$;

disposing a nonlinear material in the waveguide cavity, the nonlinear material having an index of refraction n and a propagation constant $k_{material}$;

directing electromagnetic radiation into the waveguide cavity to produce a signal; and satisfying a phase-matching condition for the signal by adjusting the propagation constant $k_{material}$ with respect to $k_{mode}$.

2. The method of claim 1, wherein the nonlinear material is a fluid.

3. The method of claim 1, wherein the nonlinear material is a gas.

4. The method of claim 3, wherein the phase-matching condition is satisfied by adjusting the pressure of the gas.

5. The method of claim 1, further comprising mixing a plurality of fluid components to produce the nonlinear material.

6. A method for nonlinear generation of a signal, comprising:
providing a waveguide that defines a waveguide cavity the waveguide having a propagation constant $k_{mode}$;
mixing a plurality of fluid components to produce a nonlinear material having an index of refraction n and a propagation constant $k_{material}$;
disposing the nonlinear material in the waveguide cavity;
directing electromagnetic radiation into the waveguide cavity to produce a signal; and
satisfying a phase-matching condition for the signal by adjusting the propagation constant $k_{material}$ with respect to $k_{mode}$, wherein the phase-matching condition is satisfied by adjusting the refractive index n of the nonlinear material by adjusting the relative proportions of the fluid components.

7. The method of claim 6, wherein the fluid components are liquids.

8. A method for nonlinear generation of a signal, comprising:
selecting a nonlinear material, the nonlinear material having an index of refraction n and a propagation constant $k_{material}$;
providing a waveguide that defines a waveguide cavity, the waveguide having a propagation constant $k_{mode}$ and being selected to satisfy a phase-matching condition for the signal;
disposing a nonlinear material in the waveguide cavity; and
directing electromagnetic radiation into the waveguide cavity to produce a signal.

9. The method of claim 8, wherein the waveguide is selected to satisfy a phase-matching condition by selecting a waveguide cross-sectional dimension.

10. The method of claim 8, wherein the waveguide is selected to satisfy a phase-matching condition by selecting a waveguide mode for the signal.

11. A method for multistage nonlinear generation of a signal, comprising:
providing first and second waveguides defining respective first and second waveguide cavities and having first and second waveguide propagation constants;
selecting first and second nonlinear materials having respective first and second material propagation constants;
disposing the first and second nonlinear materials into the first and second waveguide cavities, respectively;
directing an input electromagnetic radiation into the first waveguide;
phase-matching a first nonlinear generation process in the first waveguide by adjusting the first waveguide propagation constant or the first nonlinear material propagation constant with respect to the first waveguide propagation constant, thereby generating an intermediate signal;
directing the intermediate signal to the second waveguide;
phase-matching a second nonlinear generation process using the intermediate signal in the second waveguide, wherein phase-matching is achieved by adjusting the second waveguide propagation constant or adjusting the second nonlinear material propagation constant with respect to the second waveguide propagation constant, thereby generating the signal.

12. A method for phase matching nonlinear generation, comprising:
providing a waveguide defining a waveguide cavity;
disposing an ionized gas in the waveguide cavity, the ionized gas having a free electron density; and
selecting frequencies for input electromagnetic radiation to the waveguide such that a phase-matching condition is satisfied substantially independently of the free electron density.

13. A method for nonlinear generation of a signal from a pump and an idler, the signal, pump, and idler having frequencies $\omega_s$, $\omega_p$, $\omega_i$ and free space wavelengths $\lambda_p$, $\lambda_s$, $\lambda_i$, respectively, wherein $\omega_s = N\omega_p - M\omega_i$, and N, M are integers, the method comprising:
providing a waveguide that defines a waveguide cavity having waveguide modes;
disposing a nonlinear material in the cavity, the nonlinear material having a refractive index;
directing the pump and idler into the waveguide cavity to produce a signal; and
satisfying a phase-matching condition with a combination of the refractive index and the waveguide modes.

14. The method of claim 13, wherein the refractive index of the nonlinear material defines a material-coherence length and the waveguide defines an interaction length, wherein the interaction length is at least two times the material-coherence length.

15. The method of claim 14, wherein the interaction length is at least five times the material-coherence length.

16. The method of claim 14, wherein the waveguide cavity is cylindrical and has a radius a and a length L, the signal, pump, and idler propagate with modal constants $u_s$, $u_p$, $u_i$, respectively, and wherein the phase-matching condition is:

$$\pi \geq \frac{L}{4\pi a^2}[u_s^2 \lambda_s + M u_i^2 \lambda_i - N u_p^2 \lambda_p] - 2\pi L\left[\frac{n_s}{\lambda_s} + \frac{M n_i}{\lambda_i} - \frac{N n_p}{\lambda_p}\right] \geq -\pi$$

17. An apparatus for nonlinear generation of a signal, comprising:
a waveguide defining a waveguide cavity, the waveguide having a waveguide mode and an associated propagation constant $k_{mode}$;
a nonlinear material disposed in the waveguide cavity, the nonlinear material having an index of refraction n and a propagation constant $k_{material}$; and
the propagation constants $k_{mode}$ and $k_{material}$ satisfying a phase-matching condition for the signal frequency.

18. The apparatus of claim 17, wherein the nonlinear material is a gas and the index of refraction n of the gas is a function of gas pressure.

19. The apparatus of claim 18, further comprising a pressure regulator that adjusts the pressure of the gas to satisfy the phase-matching condition.

20. The apparatus of claim 17, wherein the nonlinear material comprises a plurality of component liquids.

21. The apparatus of claim 20, further comprising a mixing valve that mixes at least two component liquids to adjust the refractive index of the nonlinear material and thereby satisfy the phase-matching condition.

22. The apparatus of claim 17, wherein the waveguide cavity is cylindrical.

23. An apparatus for generating a signal having a wavelength between 3 nm and 300 nm, the apparatus comprising:
   a laser source that produces a laser beam; and
   an apparatus for nonlinear generation according to claim 17.

24. An apparatus for nonlinear generation, comprising:
   a waveguide that defines a waveguide cavity having waveguide modes; and
   a nonlinear material disposed in the cavity and having a refractive index, wherein a phase-matching condition is satisfied with a combination of the refractive index and the waveguide modes.

25. The apparatus of claim 24, wherein the refractive index of the nonlinear material defines a material-coherence length and the waveguide defines an interaction length, wherein the interaction length is at least two times the material-coherence length.

26. The apparatus of claim 25, wherein (a) the waveguide cavity is cylindrical and has a radius a and a length L, (b) a signal, pump, and idler propagate with modal constants $u_s$, $u_p$, $u_i$, respectively, and (c) the phase-matching condition is $$\pi \geq \frac{L}{4\pi a^2}[u_s^2 \lambda_s + M u_i^2 \lambda_i - N u_p^2 \lambda_p] - 2\pi L \left[\frac{n_s}{\lambda_s} + \frac{Mn_i}{\lambda_i} - \frac{Nn_p}{\lambda_p}\right] \geq -\pi$$

wherein $\lambda_s$, $\lambda_p$, and $\lambda_i$, are signal pump and idler wavelengths, respectively, and M and N are integers.

27. An apparatus for nonlinear generation of a signal, comprising:
   a waveguide having a propagation constant and comprising first and second waveguide sections aligned on an axis, the waveguide sections defining respective waveguide cavities;
   a gas chamber;
   gas seals through which the first and second waveguide cavities communicate with the gas chamber;
   a gas supply that delivers gas to the gas chamber, whereby gas flows through the first and second waveguide cavities and exits the gas chamber;
   a regulator that adjusts the gas pressure to achieve phase matching with respect to the waveguide propagation constant; and
   a vacuum enclosure in communication with the second waveguide cavity.

28. An apparatus for nonlinear generation of a signal, comprising:
   a waveguide having a propagation constant and comprising first, second, and third waveguide sections aligned on an axis, the waveguide sections defining respective waveguide cavities;
   a gas chamber containing the second waveguide section;
   gas seals through which the first and third waveguide cavities communicate with the chamber;
   a gas supply that delivers gas to the gas chamber, whereby gas flows through the first and third waveguide cavities and exits the gas chamber;
   a regulator that adjusts the gas pressure to achieve phase matching with respect to the waveguide propagation constant; and
   a vacuum enclosure in communication with the first and third waveguide cavities.

* * * * *

UNITED STATES PATENT AND TRADEMARK OFFICE
CERTIFICATE OF CORRECTION

PATENT NO. : 6,151,155
DATED : November 21, 2000
INVENTOR(S) : Charles G. Durfee, III, Andrew Rundquist, Henry C. Kapteyn and Margaret M. Murnane It is certified that error appears in the above-identified patent and that said Letters Patent is hereby corrected as shown below:

Column 7,
Line 56, change "$\delta(\lambda_s)\delta(\lambda_i)$," to -- $\delta(\lambda_s),\delta(\lambda_i)$ --.

Column 9,
Line 42, change "←k" to -- $\Delta k$ --.

Column 14,
Line 46, change "28" to -- 2% --.

Column 21,
Line 34, change "signal pump" to -- signal, pump --.

Signed and Sealed this

Second Day of July, 2002

Attest:

JAMES E. ROGAN
*Attesting Officer*            *Director of the United States Patent and Trademark Office*